(12) United States Patent
Terakawa et al.

(10) Patent No.: US 10,748,570 B2
(45) Date of Patent: Aug. 18, 2020

(54) MAGNETIC RECORDING MEDIUM

(71) Applicant: Sony Corporation, Tokyo (JP)

(72) Inventors: Masaru Terakawa, Miyagi (JP);
Minoru Yamaga, Miyagi (JP);
Katsunori Maeshima, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/617,960

(22) PCT Filed: Apr. 1, 2019

(86) PCT No.: PCT/JP2019/014555
§ 371 (c)(1),
(2) Date: Nov. 27, 2019

(87) PCT Pub. No.: WO2019/189941
PCT Pub. Date: Oct. 3, 2019

(65) Prior Publication Data
US 2020/0118589 A1    Apr. 16, 2020

(30) Foreign Application Priority Data

Mar. 30, 2018  (JP) .................................. 2018-070356
Nov. 19, 2018  (WO) .................. PCT/JP2018/042738

(51) Int. Cl.
*G11B 5/78*     (2006.01)
*G11B 5/008*    (2006.01)
*G11B 5/584*    (2006.01)

(52) U.S. Cl.
CPC ............ *G11B 5/78* (2013.01); *G11B 5/00813* (2013.01); *G11B 5/584* (2013.01)

(58) Field of Classification Search
CPC ........ G11B 5/78; G11B 5/00813; G11B 5/584
(Continued)

(56) References Cited

U.S. PATENT DOCUMENTS

| 2003/0113585 A1* | 6/2003 | Mori .................. G11B 5/70 |
| | | 428/842.8 |
| 2005/0276999 A1* | 12/2005 | Kuse .................. G11B 5/712 |
| | | 428/836 |
| 2018/0182422 A1* | 6/2018 | Kawakami ......... G11B 5/70642 |

FOREIGN PATENT DOCUMENTS

| JP | 09-320031 | 12/1997 |
| JP | 2002-298333 A | 10/2002 |

(Continued)

OTHER PUBLICATIONS

Japanese Office Action dated Jan. 28, 2020 in corresponding Japanese Application No. 2019-572764.
(Continued)

Primary Examiner — Allen T Cao
(74) Attorney, Agent, or Firm — K&L Gates LLP

(57) ABSTRACT

A tape-shaped magnetic recording medium includes a substrate; and a magnetic layer that is provided on the substrate and contains a magnetic powder. An average thickness of the magnetic layer is not more than 90 nm, an average aspect ratio of the magnetic powder is not less than 1.0 and not more than 3.0, the coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a value of σ1.5–σ0.5 is not more than 0.6 N in a tensile test of the magnetic recording medium in the longitudinal direction, where σ0.5 is a load at an elongation rate of 0.5% in the magnetic recording medium and σ1.5 is a load at an elongation rate of 1.5% in the magnetic recording medium.

28 Claims, 8 Drawing Sheets

(58) Field of Classification Search
USPC .......................................................... 360/134
See application file for complete search history.

(56) References Cited

FOREIGN PATENT DOCUMENTS

| | | |
|---|---|---|
| JP | 2002-367150 | 12/2002 |
| JP | 2002-373413 A | 12/2002 |
| JP | 2009-099240 A | 5/2009 |
| JP | 2010-033687 | 2/2010 |
| JP | 2011-096312 | 5/2011 |
| JP | 2017-224365 | 12/2017 |
| WO | 2018/074162 | 4/2018 |
| WO | 2019/160144 | 8/2019 |

OTHER PUBLICATIONS

Japanese Decision to Grant dated Nov. 12, 2019 in corresponding Japanese Application No. 2019-550866.

* cited by examiner

MAGNETIC RECORDING MEDIUM

TECHNICAL FIELD

The present disclosure relates to a magnetic recording medium.

BACKGROUND ART

In recent years, as a medium for data storage, a tape-shaped magnetic recording medium has attracted attention. In this magnetic recording medium, various types of improvement in characteristics have been studied. Examples of the improvement in characteristics include improvement in electromagnetic conversion characteristics.

In Patent Literatures 1 to 3, technologies for increasing dispersibility of a barium ferrite magnetic powder to improve the electromagnetic conversion characteristics have been proposed.

CITATION LIST

Patent Literature

Patent Literature 1: Japanese Patent Application Laid-open No. 2002-298333
Patent Literature 2: Japanese Patent Application Laid-open No. 2002-373413
Patent Literature 3: Japanese Patent Application Laid-open No. 2009-99240

DISCLOSURE OF INVENTION

Technical Problem

It is an object of the present disclosure to provide a magnetic recording medium capable of improving the electromagnetic conversion characteristics.

Solution to Problem

In order to achieve the above-mentioned problem, a first disclosure is a tape-shaped magnetic recording medium, including: a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a value of σ1.5−σ0.5 is not more than 0.6 N in a tensile test of the magnetic recording medium in the longitudinal direction, where σ0.5 is a load at an elongation rate of 0.5% in the magnetic recording medium and σ1.5 is a load at an elongation rate of 1.5% in the magnetic recording medium.

A second disclosure is a tape-shaped magnetic recording medium, including: a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a contraction ratio in the longitudinal direction of the magnetic recording medium preserved at 60° C. for 72 hours is not more than 0.1%.

A third disclosure is a tape-shaped magnetic recording medium, including: a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a value of (TL−TB)/TB is not more than 0.41, where TB is an average thickness of the substrate and TL is an average thickness of the magnetic recording medium.

A fourth disclosure is a tape-shaped magnetic recording medium, including: a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a Young's modulus in the longitudinal direction of the magnetic recording medium is not more than 8.5 GPa.

A fifth disclosure is a tape-shaped magnetic recording medium, including: a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a Young's modulus in the longitudinal direction of the substrate is not more than 8.0 GPa.

A sixth disclosure is a tape-shaped magnetic recording medium, including: a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and the magnetic recording medium is configured to have a width that is adjustable by increasing and decreasing tension in the longitudinal direction.

Advantageous Effects of Invention

In accordance with the present disclosure, it is possible to improve the electromagnetic conversion characteristics. It should be noted that the effect described here is not necessarily limitative and may be any effect described in the present disclosure or an effect different therefrom.

Figure 2:
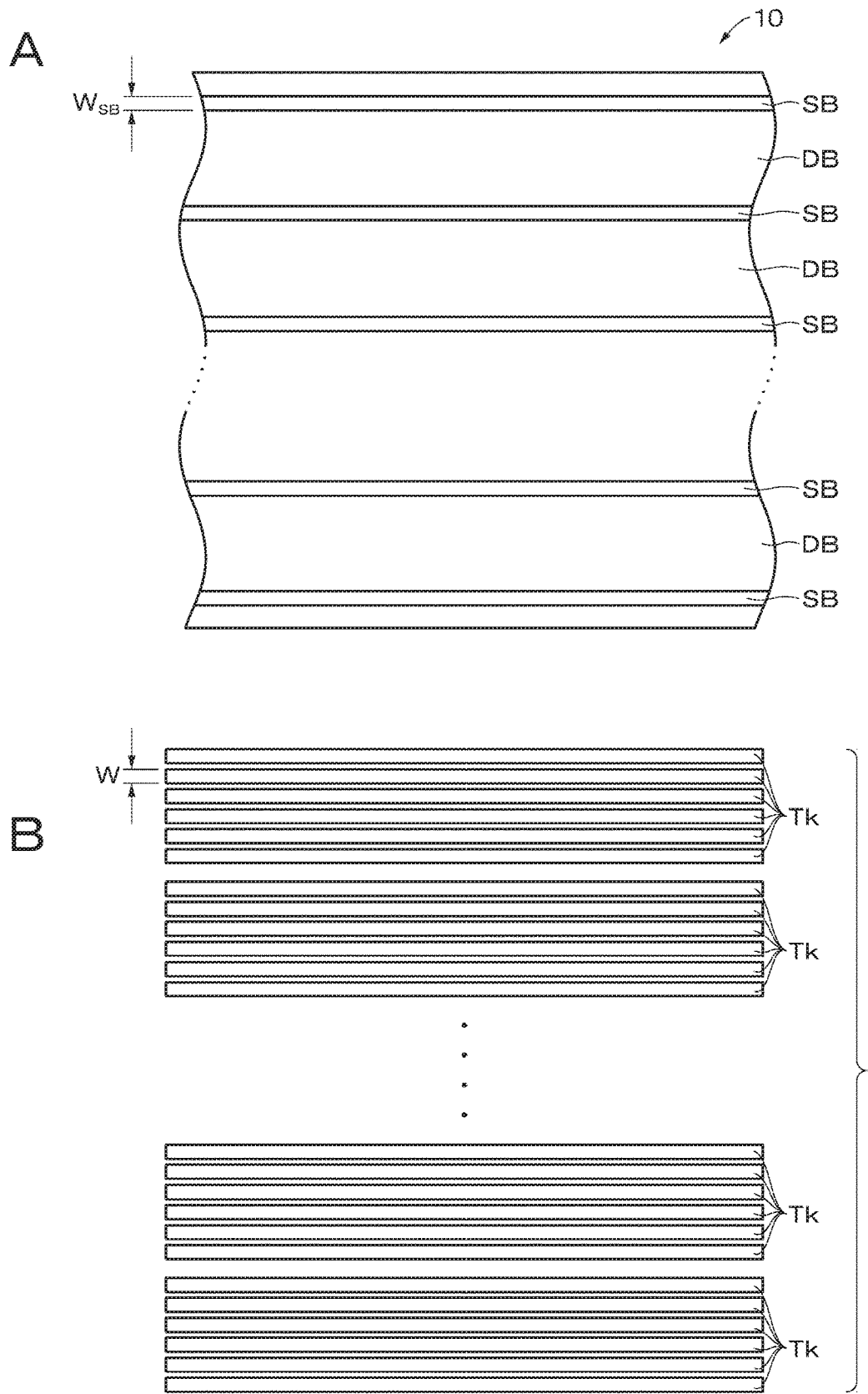

Part A of FIG. 2 is a schematic diagram of the layout of data bands and servo bands. Part B of FIG. 2 is an enlarged view of the data band.

Figure 3:
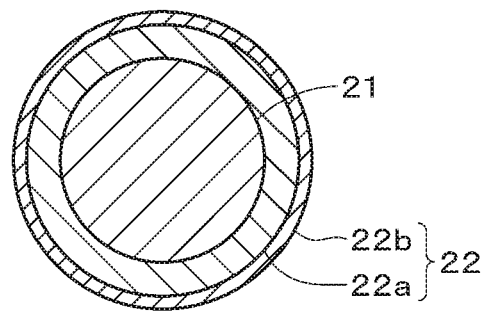

FIG. 3 is a cross-sectional view of a magnetic particle.

Figure 4:
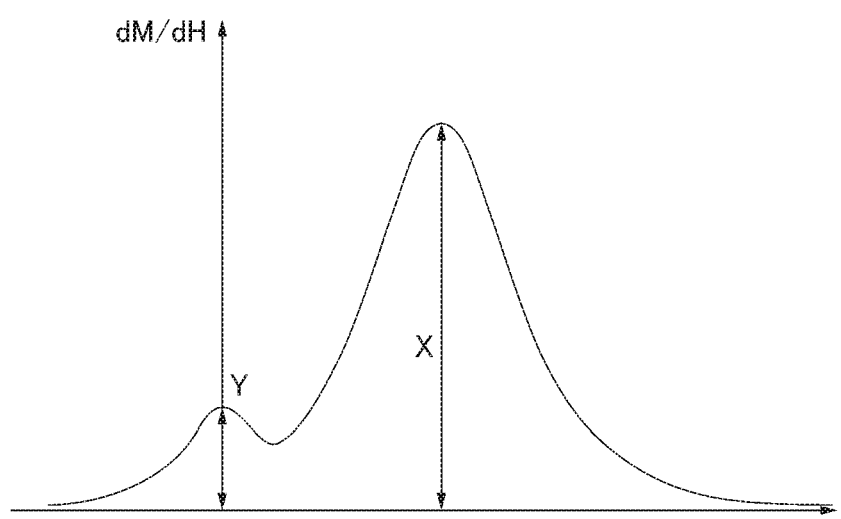

FIG. 4 is a graph showing an Example of an M-H loop.

Figure 5:
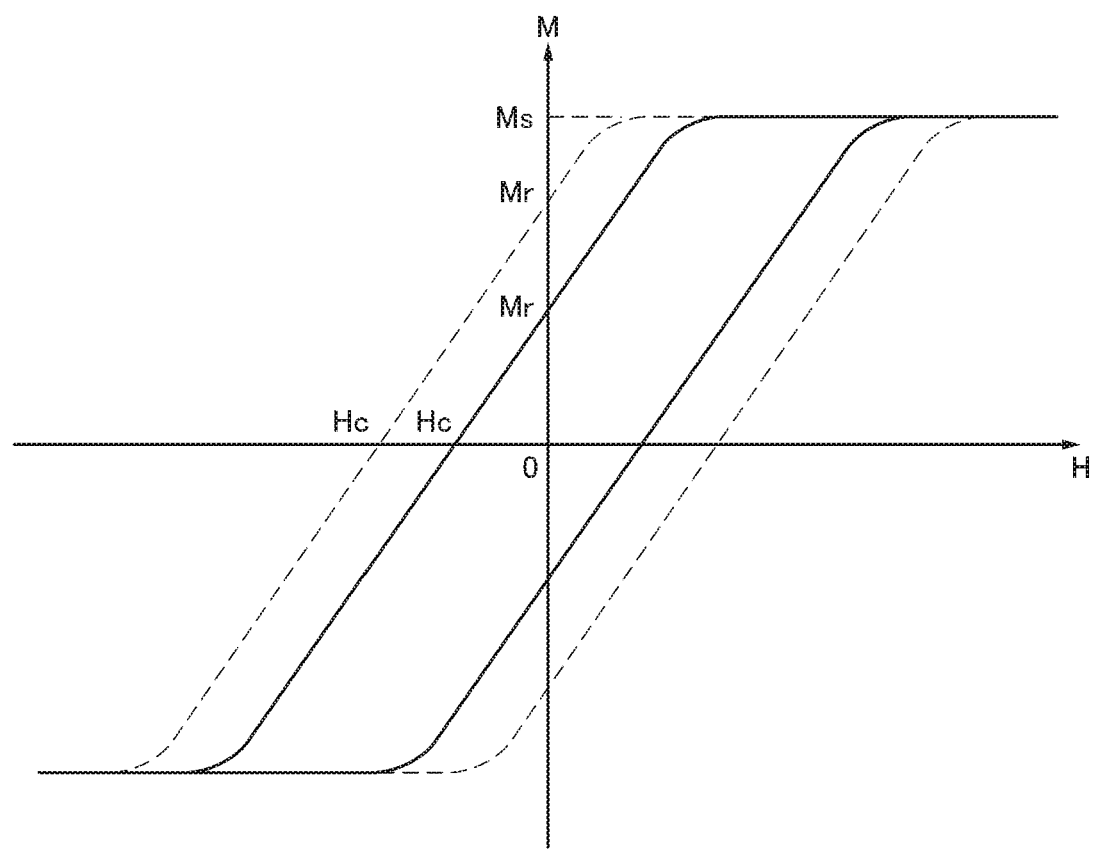

FIG. 5 is a graph showing an Example of an SFD curve.

Figure 6:
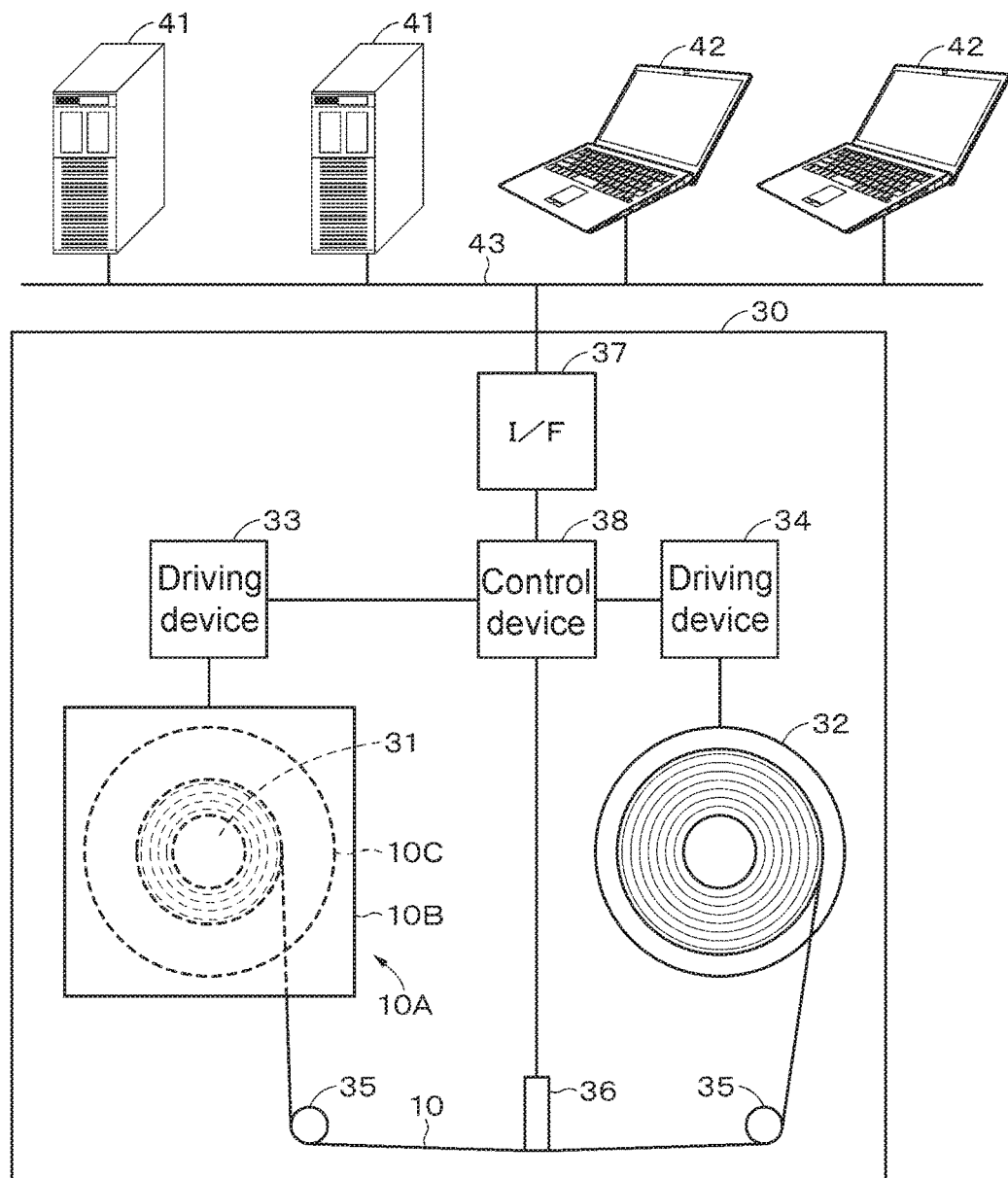

FIG. 6 is a schematic diagram of a recording/reproduction apparatus.

Figure 7:
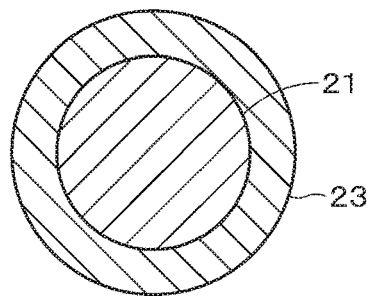

FIG. 7 is a cross-sectional view of a magnetic particle in a modified example.

Figure 8:
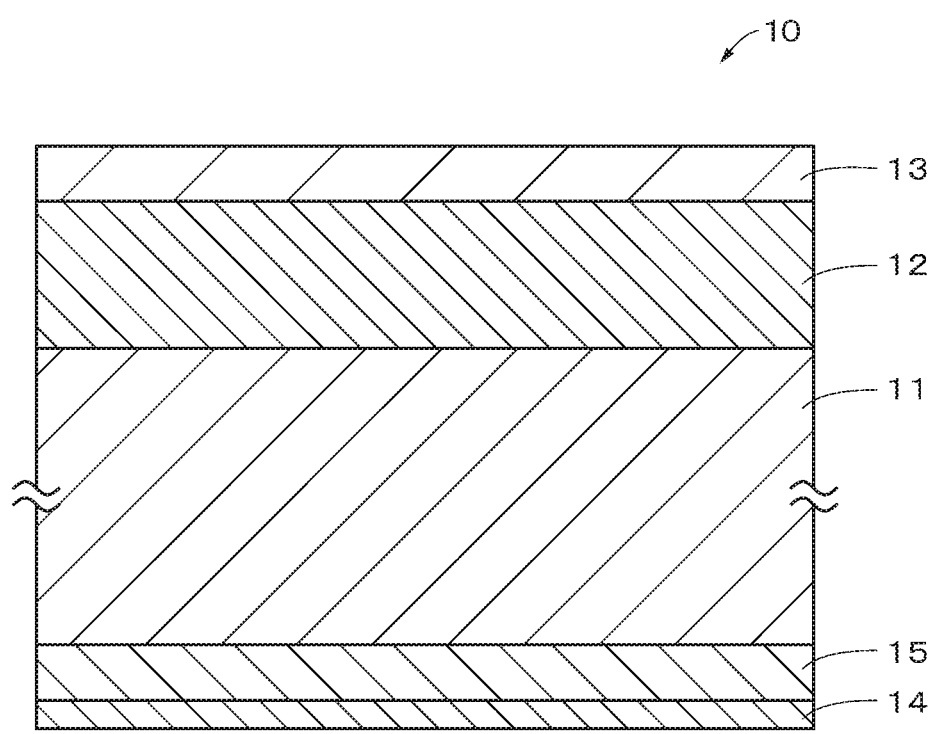

FIG. 8 is a cross-sectional view of the magnetic recording medium in the modified example.

Figure 9:
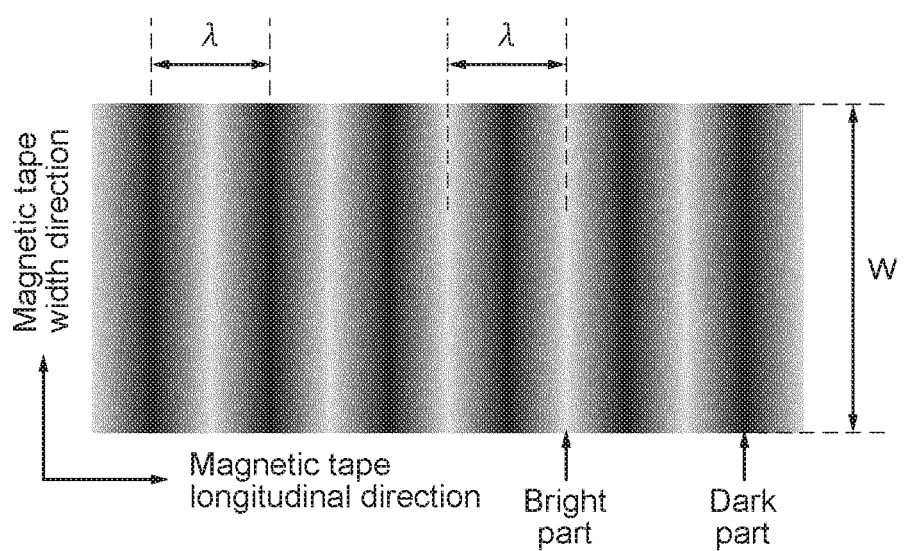
Figure 9:
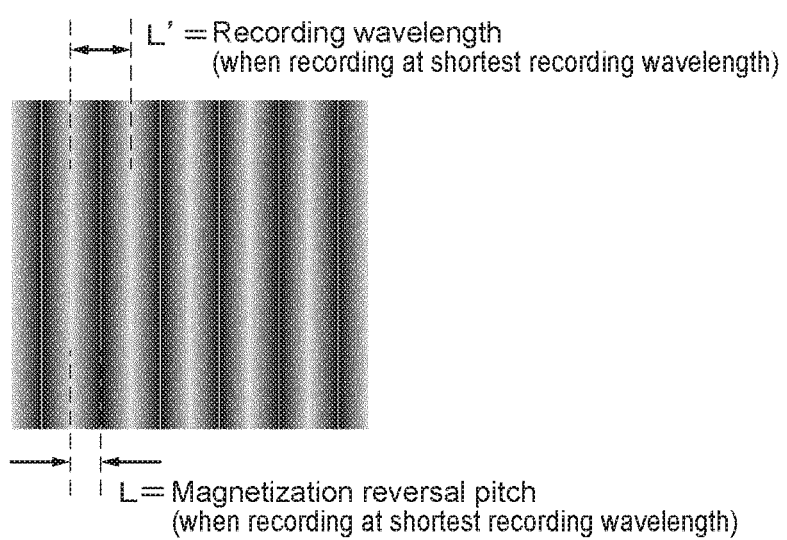

Part A of FIG. 9 shows an MFM image in the case of recording a data signal at a wavelength $\lambda$. Part B of FIG. 9 shows an MFM image in the case of recording a data signal at a shortest recording wavelength L'.

Figure 10:
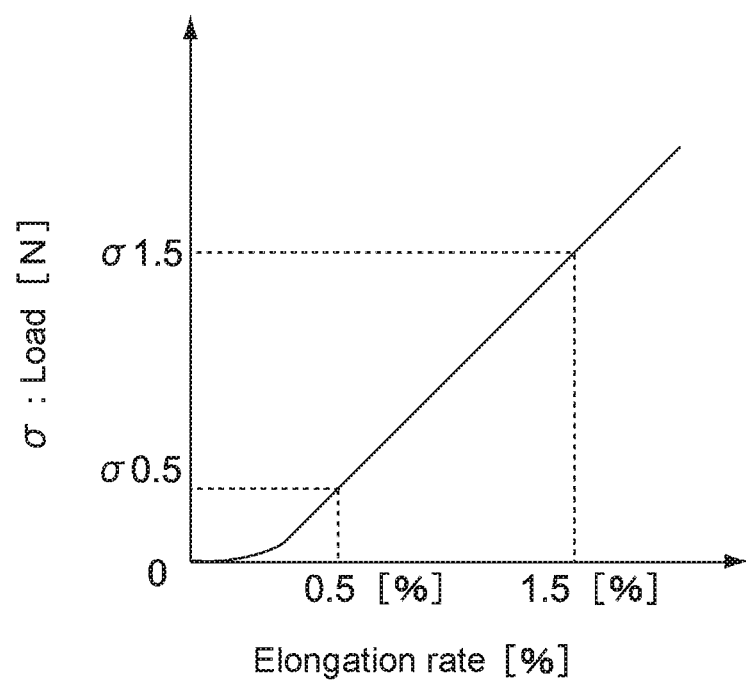

FIG. 10 is a diagram showing a relationship between an elongation rate in the longitudinal direction of a magnetic recording medium in a tensile test, and a load.

MODE(S) FOR CARRYING OUT THE INVENTION

Embodiments of the present disclosure will be described in the following order.
1 First Embodiment
1.1 Configuration of Magnetic Recording Medium
1.2 Method of Producing Magnetic Recording Medium
1.3 Configuration of Recording/reproduction Apparatus
1.4 Effect
1.5 Modified Examples
2 second embodiment

1 First Embodiment

1.1 Configuration of Magnetic Recording Medium

Figure 1:
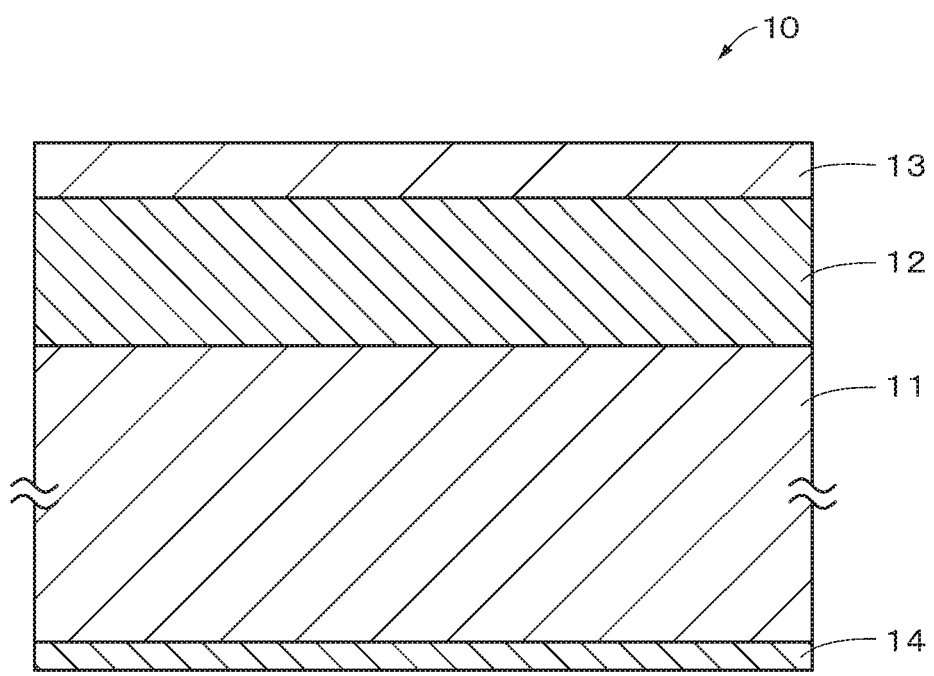
FIG. 1 is a cross-sectional view of a magnetic recording medium according to a first embodiment of the present disclosure.

First, a configuration of a magnetic recording medium 10 according to a first embodiment will be described with reference to FIG. 1. The magnetic recording medium 10 includes an elongated substrate 11, an underlayer 12 provided on one main surface of the substrate 11, a magnetic layer 13 provided on the underlayer 12, and a back layer 14 provided on the other main surface of the substrate 11. Note that the underlayer 12 and the back layer 14 are provided as necessary, and do not necessarily need to be provided.

The magnetic recording medium 10 has a long tape shape, and is caused to travel in the longitudinal direction at the time of recording/reproduction. Note that the surface of the magnetic layer 13 is a surface on which a magnetic head is caused to travel. The magnetic recording medium 10 is favorably used in a recording/reproduction apparatus including a ring-type head as a recording head. Note that in the specification, "vertical direction" means a direction (thickness direction of the magnetic recording medium 10) perpendicular to the surface of the magnetic recording medium 10. The "longitudinal direction" means the longitudinal direction (travelling direction) of the magnetic recording medium 10.

(Substrate)

The substrate 11 is a non-magnetic support that supports the underlayer 12 and the magnetic layer 13. The substrate 11 has a long film shape. The upper limit value of the average thickness of the substrate 11 is favorably not more than 4.2 μm, more favorably not more than 3.8 μm, and still more favorably not more than 3.4 μm. In the case where the upper limit value of the substrate 11 is not more than 4.2 μm, the recording capacity of one data cartridge can be increased as compared with that of a general magnetic recording medium. The lower limit value of the average thickness of the substrate 11 is favorably not less than 3 μm and more favorably not less than 3.2 μm. In the case where the lower limit value of the average thickness of the substrate 11 is not less than 3 μm, the reduction in strength of the substrate 11 can be suppressed.

The average thickness of the substrate 11 is obtained as follows. First, the magnetic recording medium 10 having a width of ½ inch is prepared and cut into a 250 mm length to prepare a sample. Subsequently, layers (i.e., the underlayer 12, the magnetic layer 13, and the back layer 14) of the sample other than the substrate 11 are removed with a solvent such as MEK (methyl ethyl ketone) and dilute hydrochloric acid. Next, the thickness of the sample (substrate 11) is measured at five or more points by using a laser hologauge manufactured by Mitsutoyo Corporation as a measurement apparatus, and the measured values are simply averaged (arithmetic average) to calculate the average thickness of the substrate 11. Note that the measurement positions are randomly selected from the sample.

The substrate 11 contains, for Example, at least one of polyesters, polyolefins, cellulose derivatives, vinyl resins, or other polymer resins. In the case where the substrate 11 contains two or more of the above-mentioned materials, the two or more materials may be mixed, copolymerized, or stacked.

The polyesters include, for Example, at least one of PET (polyethylene terephthalate), PEN (polyethylene naphthalate), PBT (polybutylene terephthalate), PBN (polybutylene naphthalate), PCT (polycyclohexylenedimethylene terephthalate), PEB (polyethylene-p-oxybenzoate), or polyethylene bisphenoxy carboxylate.

The polyolefins include, for Example, at least one of PE (polyethylene) and PP (polypropylene). The cellulose derivatives include, for Example, at least one of cellulose diacetate, cellulose triacetate, CAB (cellulose acetate butyrate), or CAP (cellulose acetate propionate). The vinyl resins include, for Example, at least one of PVC (polyvinyl chloride) or PVDC (polyvinylidene chloride).

The other polymer resins include, for Example, at least one of PA (polyamide, nylon), aromatic PA (aromatic polyamide, aramid), PI (polyimide), aromatic PI (aromatic polyimide), PAI (polyamide imide), aromatic PAI (aromatic polyamide imide), PBO (polybenzoxazole, e.g., Zylon (registered trademark)), polyether, PEK (polyether ketone), polyether ester, PES (polyether sulfone), PEI (polyether imide), PSF (polysulfone), PPS (polyphenylene sulfide), PC (polycarbonate), PAR (polyarylate), or PU (polyurethane).

(Magnetic Layer)

The magnetic layer 13 is a recording layer for recording a signal. The magnetic layer 13 contains, for Example, a magnetic powder and a binder. The magnetic layer 13 may further contain, as necessary, at least one additive of a lubricant, an antistatic agent, an abrasive, a curing agent, a rust inhibitor, or a non-magnetic reinforcing particle.

As shown in Part A of FIG. 2, the magnetic layer 13 favorably includes a plurality of servo bands SB and a plurality of data bands DB in advance. The plurality of servo bands SB is provided in the width direction of the magnetic recording medium 10 at equal intervals. Between adjacent servo bands SB, a data band DB is provided. In each of the servo bands SB, a servo signal for tracking controlling of a magnetic head is written in advance. In each of the data bands DB, user data is recorded.

The upper limit value of a ratio $R_S$ ($=(S_{SB}/S)\times100$) of a total area $S_{SB}$ of the servo bands SB to an area S of the surface of the magnetic layer 13 is favorably not more than 4.0%, more favorably not more than 3.0%, and still more favorably not more than 2.0% from the viewpoint of securing a high recording capacity. Meanwhile, the lower limit value of the ratio $R_S$ of the total area $S_{SB}$ of the servo bands SB to the area S of the surface of the magnetic layer 13 is favorably not less than 0.8% from the viewpoint of securing five or more servo tracks.

The ratio $R_S$ of the total area $S_{SB}$ of the servo bands SB to the area S of the surface of the magnetic layer 13 is obtained as follows. First, the surface of the magnetic layer 13 is observed by using a magnetic force microscope (MFM) to acquire an MFM image. Subsequently, the acquired MFM image is used for measuring a servo band width $W_{SB}$ and the number of servo bands SB. Next, the ratio $R_S$ is obtained on the basis of the following formula.

Ratio $R_S$ [%]=(((servo band width $W_{SB}$)×(number of servo bands))/(width of the magnetic recording medium 10))×100

The lower limit value of the number of servo bands SB is favorably not less than five, more favorably 5+4n (where n represents a positive number), and still more favorably not less than 9+4n. In the case where the number of servo bands SB is not less than 5, the influence on the servo signal due to the dimensional change of the magnetic recording medium 10 in the width direction is suppressed, and stable recording/reproduction characteristics with less off-track can be secured. Although the upper limit value of the number of servo bands SB is not particularly limited, it is not more than 33, for Example.

The number of servo bands SB can be checked as follows. First, the surface of the magnetic layer 13 is observed by using a magnetic force microscope (MFM) to acquire an MFM image. Next, the MFM image is used for counting the number of servo bands SB.

The upper limit value of the servo band width $W_{SB}$ is favorably not more than 95 μm, more favorably not more than 60 μm, and still more favorably not more than 30 μm from the viewpoint of securing a high recording capacity. The lower limit value of the servo band width $W_{SB}$ is favorably not less than 10 μm. It is difficult to produce a recording head capable of reading a servo signal of the servo band width $W_{SB}$ of less than 10 μm.

The width of the servo band width $W_{SB}$ is obtained as follows. First, the surface of the magnetic layer 13 is observed by using a magnetic force microscope (MFM) to acquire an MFM image. Next, the MFM image is used for measuring the width of the servo band width $W_{SB}$.

As shown in Part B of FIG. 2, the magnetic layer 13 is configured to be capable of having a plurality of data tracks Tk in the data band DB. The upper limit value of a width W of each of the data tracks is favorably not more than 3.0 μm, more favorably not more than 1.6 μm, still more favorably not more than 0.95 μm, and particularly favorably not more than 0.51 μm from the viewpoint of improving the track recording density and securing a high recording capacity. The lower limit value of the width W of each of the data tracks is favorably not less than 0.02 μm considering the size of the magnetic particle.

The magnetic layer 13 is configured to be capable of recording data so that a minimum value L of the magnetization reversal pitch and the width W of each of the data tracks satisfy the relationship of W/L≤200, more favorably W/L≤60, still more favorably W/L≤45, and particularly favorably W/L≤30. In the case where the minimum value L of the magnetization reversal pitch is a constant value and the minimum value L of the magnetization reversal pitch and the track width W satisfy the relationship of W/L>200 (i.e., in the case where the track width W is large), there is a possibility that the recording capacity cannot be sufficiently secured because the track recording density dose not increase. Further, in the case where the track width W is a constant value and the minimum value L of the magnetization reversal pitch satisfy the relationship of W/L>200 (i.e., the minimum value L of the magnetization reversal pitch is small), although the bit length is reduced and the linear recording density increases, there is a possibility that SNR is significantly deteriorated due to the influence of spacing loss. Therefore, in order to suppress the deterioration of SNR while securing the recording capacity, it is favorable that W/L is within the range of not more than 60 (W/L≤60) as described above. However, W/L is not limited to the above-mentioned range, and may be within the range of not more than 23 or not more than 13 (W/L≤23 or W/L≤13). The lower limit value of W/L is not particularly limited, and is, for Example, not less than one (1≤W/L).

The magnetic layer 13 is configured to be capable of recording data so that the minimum value of the magnetization reversal pitch L is favorably not more than 50 nm, more favorably not more than 48 nm, still more favorably not more than 44 nm, and particularly favorably not more than 40 nm from the viewpoint of securing a high recording capacity. The lower limit value of the minimum value of the magnetization reversal pitch L is favorably not less than 20 nm considering the size of the magnetic particle.

The upper limit value of the average thickness of the magnetic layer 13 is favorably not more than 90 nm, particularly favorably not more than 80 nm, more favorably not more than 70 nm, and still more favorably not more than 50 nm. In the case where the upper limit value of the average thickness of the magnetic layer 13 is not more than 90 nm, it is possible to improve the electromagnetic conversion characteristics (e.g., C/N (Carrier to Noise Ratio)) because the magnetization can be uniformly recorded in the thickness direction of the magnetic layer 13 when using a ring-type head as a recording head.

The lower limit value of the average thickness of the magnetic layer 13 is favorably not less than 30 nm and more favorably not less than 35 nm. In the case where the upper limit value of the average thickness of the magnetic layer 13 is not less than 30 nm, it is possible to improve the electromagnetic conversion characteristics (e.g., C/N) because output can be secured when using an MR-type head as a reproduction head.

The average thickness of the magnetic layer 13 is obtained as follows. First, the magnetic recording medium 10 is thinly processed perpendicular to the main surface thereof to prepare a test piece, and the cross section of the test piece is observed by using a transmission electron microscope (TEM). The apparatus and observation conditions are shown below.

Apparatus: TEM (H9000NAR manufactured by Hitachi. Ltd.)
Acceleration voltage: 300 kV
Magnification: 100,000

Next, the obtained TEM image is used for measuring the thickness of the magnetic layer 13 at at least 10 or more positions in the longitudinal direction of the magnetic recording medium 10, and then, the measured values are simply averaged (arithmetic average) to obtain the average thickness of the magnetic layer 13. Note that the measurement positions are randomly selected from the test piece.

(Magnetic Powder)

The magnetic powder includes a powder of nanoparticles (hereinafter, referred to as "ε-iron oxide particle") containing ε-iron oxide. The ε-iron oxide particle is a hard magnetic particle from which a high coercive force can be achieved even in the case where it is a fine particle. It is favorable that the ε-iron oxide contained in the ε-iron oxide particle is crystal oriented preferentially in the vertical direction.

The ε-iron oxide particle has a spherical or substantially spherical shape, or has a cubic or substantially cubic shape. Since the ε-iron oxide particle has the shape as described above, in the case of using the ε-iron oxide particle as a magnetic particle, the contact area between the particles in the thickness direction of the magnetic recording medium 10 can be reduced and aggregation of the particles can be suppressed as compared with the case of using a hexagonal plate-like barium ferrite particle as a magnetic particle. Therefore, it is possible to enhance the dispersibility of the magnetic powder, and achieve more excellent electromagnetic conversion characteristics (e.g., C/N).

The ε-iron oxide particle has a core-shell structure. Specifically, as shown in FIG. 3, the ε-iron oxide particle includes a core portion 21, and a shell portion 22 that is provided around the core portion 21 and has a 2-layer structure. The shell portion 22 having the 2-layer structure includes a first shell portion 22a provided on the core portion 21, and a second shell portion 22b provided on the first shell portion 22a.

The core portion 21 contains ε-iron oxide. The ε-iron oxide contained in the core portion 21 favorably has an ε-$Fe_2O_3$ crystal as a main phase, and is more favorably formed of a single phase of ε-$Fe_2O_3$.

The first shell portion 22a covers at least a part of the periphery of the core portion 21. Specifically, the first shell portion 22a may partially cover the periphery of the core portion 21, or may cover the entire periphery of the core portion 21. It is favorable that the entire surface of the core portion 21 is covered from the viewpoint of making the exchange coupling between the core portion 21 and the first shell portion 22a sufficient and improving the magnetic properties.

The first shell portion 22a is a so-called soft magnetic layer, and contains, for Example, a soft magnetic material such as α-Fe, an Ni—Fe alloy, and an Fe—Si—Al alloy. α-Fe may be one obtained by reducing ε-iron oxide contained in the core portion 21.

The second shell portion 22b is an oxide coating film as an oxidation prevention layer. The second shell portion 22b contains α-iron oxide, aluminum oxide, or silicon oxide. The α-iron oxide contains, for Example, at least one iron oxide of $Fe_3O_4$, $Fe_2O_3$, or FeO. In the case where the first shell portion 22a contains α-Fe (soft magnetic material), the α-iron oxide may be one obtained by oxidizing α-Fe contained in the first shell portion 22a.

Since the ε-iron oxide particle includes the first shell portion 22a as described above, a coercive force Hc of the entire ε-iron oxide particle (core-shell particle) can be adjusted to the coercive force Hc suitable for recording while maintaining the coercive force Hc of the core portion 21 alone to a large value to secure thermal stability. Further, since the ε-iron oxide particle includes the second shell portion 22b as described above, it is possible to prevent the characteristics of the ε-iron oxide particle from being reduced due to occurrence of rust or the like on the particle surface by exposure of the ε-iron oxide particle to the air during and before the process of producing the magnetic recording medium 10. Therefore, it is possible to suppress characteristic deterioration of the magnetic recording medium 10.

The average particle size (average maximum particle size) of the magnetic powder is favorably not more than 22 nm, more favorably not less than 8 nm and not more than 22 nm, and still more favorably not less than 12 nm and not more than 22 nm. In the magnetic recording medium 10, a region having a size of half the recording wavelength is an actual magnetization region. Therefore, by setting the average particle size of the magnetic powder to half or less of the shortest recording wavelength, it is possible to achieve favorable S/N. Therefore, in the case where the average particle size of the magnetic powder is not more than 22 nm, it is possible to achieve favorable electromagnetic conversion characteristics (e.g., C/N) in the magnetic recording medium 10 having a high recording density (e.g., the magnetic recording medium 10 configured to be capable of recording a signal at the shortest recording wavelength of not more than 44 nm). Meanwhile, in the case where the average particle size of the magnetic powder is not less than 8 nm, the dispersibility of the magnetic powder is improved, and more excellent electromagnetic conversion characteristics (e.g., C/N) can be achieved.

The average aspect ratio of the magnetic powder is favorably not less than 1.0 and not more than 3.0, more favorably not less than 1.0 and not more than 2.5, still more favorably not less than 1.0 and not more than 2.1, and particularly favorably not less than 1.0 and not more than 1.8. In the case where the average aspect ratio of the magnetic powder is within the range of not less than 1.0 and not more than 3.0, aggregation of the magnetic powder can be suppressed and the resistance applied to the magnetic powder when the magnetic powder is vertically oriented in the process of forming the magnetic layer 13 can be suppressed. Therefore, it is possible to increase the degree of vertical orientation of the magnetic powder. Therefore, it is possible to improve the electromagnetic conversion characteristics (e.g., C/N).

The average particle size and average aspect ratio of the magnetic powder described above are obtained as follows. First, the magnetic recording medium 10 to be measured is processed by an FIB (Focused Ion Beam) method or the like to prepare a slice, and the cross section of the slice is observed by TEM. Next, 50 ε-iron oxide particles are randomly selected from the captured TEM photograph, and a major axis length DL and a minor axis length DS of each of the ε-iron oxide particles are measured. Here, the major axis length DL means the largest one (so-called maximum Feret diameter) of distances between two parallel lines drawn from all angles so as to contact the outline of the ε-iron oxide particle. Meanwhile, the minor axis length DS means the largest one of lengths of the ε-iron oxide particle in the direction perpendicular to the major axis of the ε-iron oxide particle.

Subsequently, the major axis lengths DL of the 50 measured ε-iron oxide particles are simply averaged (arithmetic average) to obtain an average major axis length DLave. The average major axis length DLave thus obtained is taken as the average particle size of the magnetic powder. Further, the minor axis lengths DS of the 10 measured ε-iron oxide particles are simply averaged (arithmetic average) to obtain an average minor axis length DSave. Then, on the basis of the average major axis length DLave and the average minor axis length DSave, the average aspect ratio (DLave/DSave) of the ε-iron oxide particle is obtained.

The average particle volume of the magnetic powder is favorably not more than 5600 nm³, more favorably not less than 250 nm³ and not more than 5600 nm³, and still more favorably not less than 900 nm³ and not more than 5600 nm³. In the case where the average particle volume of the magnetic powder is not more than 5600 nm³, effects similar to those in the case where the average particle size of the magnetic powder is not more than 22 nm are achieved. Meanwhile, in the case where the average particle volume of the magnetic powder is not less than 250 nm³, effects similar to those in the case where the average particle size of the magnetic powder is not less than 8 nm are achieved.

In the case where the ε-iron oxide particle has a spherical or substantially spherical shape, the average particle volume of the magnetic powder is obtained as follows. First, similarly to the above-mentioned method of calculating the average particle size of the magnetic powder, the average major axis length DLave is obtained. Next, an average volume V of the magnetic powder is obtained using the following formula.

$$V = (\pi/6) \times DL\text{ave}^3$$

In the case where the ε-iron oxide particle has a cubic or substantially cubic shape, the average volume of the magnetic powder is obtained as follows. First, similarly to the above-mentioned method of calculating the average particle size of the magnetic powder, the average major axis length DLave is obtained. Next, the average volume V of the magnetic powder is obtained using the following formula.

$$V = DL\text{ave}^3$$

(Binder)

Examples of the binder include a thermoplastic resin, a thermosetting resin, and a reactive resin. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, an acrylate ester-acrylonitrile copolymer, an acrylate ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenol resin, an epoxy resin, a polyurethane curable resin, a urea resin, a melamine resin, an alkyd resin, a silicone resin, a polyamine resin, and a urea formaldehyde resin.

Further, in order to improve the dispersibility of the magnetic powder, polar functional groups such as —SO₃M, —OSO₃M, —COOM, P=O(OM)₂ (where M in the formula represents a hydrogen atom or an alkali metal such as lithium, potassium, and sodium), a side-chain amine having a terminal group represented by —NR1R2 or —NR1R2R3⁺ X⁻, a main-chain amine represented by >NR1R2⁺X⁻ (where R1, R2, and R3 in the formula each represent a hydrogen atom or a hydrocarbon group, and X⁻ represents a halogen element ion such as fluorine, chlorine, bromine, and iodine, or an inorganic or organic ion), —OH, —SH, —CN, and an epoxy group may be introduced into all the above-mentioned binders. The amount of polar functional groups introduced into the binder is favorably 10⁻¹ to 10⁻⁸ mol/g and more favorably 10⁻² to 10⁻⁶ mol/g.

(Lubricant)

Examples of the lubricant include an ester of a monobasic fatty acid having 10 to 24 carbon atoms and any of monohydric to hexahydric alcohols having 2 to 12 carbon atoms, a mixed ester thereof, a di-fatty acid ester, and a tri-fatty acid ester. Specific Example of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, and octyl myristate.

(Antistatic Agent)

Examples of the antistatic agent include carbon black, a natural surfactant, a nonionic surfactant, and a cationic surfactant.

(Abrasive)

Examples of the abrasive include α-alumina with an alpha conversion rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-like α-iron oxide obtained by dehydrating and annealing magnetic iron oxide raw material, and those obtained by performing surface treatment with aluminum and/or silica as necessary.

(Curing Agent)

Examples of the curing agent include polyisocyanate. Examples of polyisocyanate include an aromatic polyisocyanate such as an adduct of tolylene diisocyanate (TDI) with and an active hydrogen compound, and an aliphatic polyisocyanate such as an adduct of hexamethylene diisocyanate (HMDI) with an active hydrogen compound. The weight average molecular weight of the polyisocyanates is favorably within the range of 100 to 3000.

(Rust Inhibitor)

Examples of the rust inhibitor include phenols, naphthols, quinones, heterocyclic compounds containing a nitrogen atom, heterocyclic compounds containing an oxygen atom, and heterocyclic compounds containing a sulfur atom.

(Non-Magnetic Reinforcing Particle)

Examples of the non-magnetic reinforcing particle include aluminum oxide (α, β, or γ alumina), chromium oxide, silicon oxide, diamond, garnet, emery, boron nitride, titanium carbide, silicon carbide, titanium carbide, and titanium oxide (rutile or anatase titanium oxide).

(Underlayer)

The underlayer 12 is a non-magnetic layer containing a non-magnetic powder and a binder. The underlayer 12 may further contain, as necessary, at least one additive of a lubricant, an antistatic agent, a curing agent, or a rust inhibitor.

The average thickness of the underlayer 12 is favorably not less than 0.6 μm and not more than 2.0 μm and more favorably not less than 0.8 μm and not more than 1.4 μm. Note that the average thickness of the underlayer 12 is obtained similarly to the average thickness of the magnetic layer 13. Note that the magnification of the TEM image is appropriately adjusted in accordance with the thickness of the underlayer 12.

(Non-Magnetic Powder)

The non-magnetic powder contains, for Example, at least one of an inorganic particle powder or an organic particle powder. Further, the non-magnetic powder may contain a carbon powder such as carbon black. Note that one nonmagnetic powder may be used alone, or two or more non-magnetic powders may be used in combination. The inorganic particle contains, for Example, a metal, a metal oxide, a metal carbonate, a metal sulfate, a metal nitride, a metal carbide, or a metal sulfide. Examples of the shape of the non-magnetic powder include, but not limited to, various shapes such as a needle shape, a spherical shape, a cubic shape, and a plate shape.

(Binder)

The binder is similar to that of the above-mentioned magnetic layer 13.

(Additive)

The lubricant, the antistatic agent, the curing agent, and the rust inhibitor are similar to those of the above-mentioned magnetic layer 13.

(Back Layer)

The back layer 14 contains a binder and a non-magnetic powder. The back layer 14 may further contain, as necessary, at least one additive of a lubricant, a curing agent, or an antistatic agent. The binder and the non-magnetic powder are similar to those of the above-mentioned underlayer 12.

The average particle size of the non-magnetic powder is favorably not less than 10 nm and not more than 150 nm and more favorably not less than 15 nm and not more than 110 nm. The average particle size of the non-magnetic powder is obtained similarly to the average particle size of the above-mentioned magnetic powder. The non-magnetic powder may contain a non-magnetic powder having two or more types of particle size distribution.

The upper limit value of the average thickness of the back layer 14 is favorably not more than 0.6 μm. In the case where the upper limit value of the average thickness of the back layer 14 is not more than 0.6 μm, the thicknesses of the underlayer 12 and the substrate 11 can be kept thick even when the average thickness of the magnetic recording medium 10 is not more than 5.6 μm. Therefore, the travelling stability of the magnetic recording medium 10 in the recording/reproduction apparatus can be maintained. The lower limit value of the average thickness of the back layer 14 is not particularly limited, but is, for Example, not less than 0.2 μm.

The average thickness of the back layer 14 is obtained as follows. First, the magnetic recording medium 10 having a width of ½ inch is prepared and cut into a 250 mm length to prepare a sample. Next, the thickness of the sample is measured at five or more points by using a laser hologauge manufactured by Mitsutoyo Corporation as a measurement apparatus, and the measured values are simply averaged (arithmetic average) to calculate an average thickness $t_T$ [μm] of the magnetic recording medium 10. Note that the measurement positions are randomly selected from the sample. Subsequently, the back layer 14 of the sample is removed with a solvent such as MEK (methyl ethyl ketone) and dilute hydrochloric acid. After that, the above-mentioned laser hologauge is used again for measuring the thickness of the sample at five or more points, and the measured values are simply averaged (arithmetic average) to calculate an average thickness $t_B$ [μm] of the magnetic recording medium 10 from which the back layer 14 has been removed. Note that the measurement positions are randomly selected from the sample. After that, an average thickness $t_b$ [μm] of the back layer 14 is obtained using the following formula.

$$t_b\ [\mu m] = t_T\ [\mu m] - t_B\ [\mu m]$$

(Average Thickness of Magnetic Recording Medium)

The upper limit value of the average thickness (average total thickness) of the magnetic recording medium 10 is favorably not more than 5.6 μm, more favorably not more than 5.0 μm, particularly favorably not more than 4.6 μm, and still more favorably not more than 4.4 μm. In the case where the average thickness of the magnetic recording medium 10 is not more than 5.6 μm, the recording capacity of one data cartridge can be increased as compared with that of a general magnetic recording medium. The lower limit value the average thickness of the magnetic recording medium 10 is not particularly limited, but is, for Example, not less than 3.5 μm.

The average thickness of the magnetic recording medium 10 is obtained by the procedure described in the above-mentioned method of obtaining the average thickness of the back layer 14.

(Coercive Force Hc1 in Vertical Direction)

The upper limit value of a coercive force Hc1 in the vertical direction is favorably not more than 3000 Oe, more favorably not more than 2900 Oe, and still more favorably not more than 2850 Oe. A large coercive force Hc1 is favorable because influence of thermal disturbance and a demagnetizing field becomes less. However, in the case where the coercive force Hc1 exceeds 3000 Oe, there is a possibility that saturated recording in a recording head becomes difficult, which causes a part that cannot be recorded and increases noise, resulting in deterioration of the electromagnetic conversion characteristics (e.g., C/N).

The lower limit value of the coercive force Hc1 in the vertical direction is favorably not less than 2200 Oe, more favorably not less than 2400 Oe, and still more favorably not less than 2600 Oe. In the case where the coercive force Hc1 is not less than 2200 Oe, it is possible to suppress reduction in the electromagnetic conversion characteristics (e.g., C/N) under a high-temperature environment due to influence of thermal disturbance and influence of a demagnetizing field.

The above-mentioned coercive force Hc1 is obtained as follows. First, a measurement sample is cut out of the elongated magnetic recording medium 10, and an M-H loop of the entire measurement sample is measured in the vertical direction (thickness direction) of the measurement sample by using a vibrating sample magnetometer (VSM). Next, the coating films (the underlayer 12, the magnetic layer 13, the back layer 14, and the like) are wiped by using acetone, ethanol, or the like, leaving only the substrate 11 as a sample for background correction. The M-H loop of the substrate 11 is measured in the vertical direction (thickness direction) by using VSM. After that, the M-H loop of the substrate 11 is subtracted from the M-H loop of the entire measurement sample to obtain the M-H loop after background correction. The coercive force Hc1 is obtained on the basis of the obtained M-H loop. Note that all of the above-mentioned M-H loops are measured at 25° C. Further, "demagnetizing field correction" when measuring the M-H loop in the vertical direction of the magnetic recording medium 10 is not performed.

(Coercive Force Hc2 in Longitudinal Direction)

The upper limit value of a coercive force Hc2 in the longitudinal direction is favorably not more than 2000 Oe, more favorably not more than 1900 Oe, and still more favorably not more than 1800 Oe. In the case where the coercive force Hc2 in the longitudinal direction is not more than 2000 Oe, it is possible to form a favorable recording pattern because magnetization reacts sensitively by the magnetic field in the vertical direction from the recording head.

The lower limit value of the coercive force Hc2 in the longitudinal direction is favorably not less than 1000 Oe. In the case where the coercive force Hc2 in the longitudinal direction is not less than 1000 Oe, it is possible to suppress demagnetization due to leakage flux from the recording head.

The above-mentioned coercive force Hc2 is obtained similarly to the coercive force Hc1 in the vertical direction except that the M-H loop of the entire measurement sample and the M-H loop of the sample for background correction are measured in the direction corresponding to the longitudinal direction (travelling direction) of the magnetic recording medium 10.

(Hc2/Hc1)

A ratio Hc2/Hc1 of the coercive force Hc1 in the vertical direction and the coercive force Hc2 in the longitudinal direction satisfies the relationship of Hc2/Hc1≤0.8, favorably Hc2/Hc1≤0.75, more favorably Hc2/Hc1≤0.7, still more favorably Hc2/Hc1≤0.65, and particularly favorably Hc2/Hc1≤0.6. In the case where the coercive forces Hc1 and Hc2 satisfy the relationship of Hc2/Hc1≤0.8, it is possible to increase the degree of vertical orientation of the magnetic powder. Therefore, since the magnetization transition width can be reduced and a high output signal can be achieved at the time of signal reproduction, it is possible to improve the electromagnetic conversion characteristics (e.g., C/N). Note that since magnetization reacts sensitively by the magnetic field in the vertical direction from the recording head in the case where Hc2 is small as described above, it is possible to form a favorable recording pattern.

In the case where the ratio Hc2/Hc1 satisfies the relationship of Hc2/Hc1≤0.8, it is particularly effective that the average thickness of the magnetic layer 13 is not more than 90 nm. In the case where the average thickness of the magnetic layer 13 exceeds 90 nm, there is a possibility that the lower region (region on the side of the underlayer 12) of the magnetic layer 13 is magnetized in the longitudinal direction when a ring-type head is used as a recording head, which makes it impossible to uniformly magnetize the magnetic layer 13 in the thickness direction. Therefore, there is a possibility that the electromagnetic conversion characteristics (e.g., C/N) cannot be improved even if the ratio Hc2/Hc1 satisfies the relationship of Hc2/Hc1≤0.8 (i.e., even if the degree of vertical orientation of the magnetic powder is increased).

The lower limit value of Hc2/Hc1 is not particularly limited, but is, for Example, not less than 0.5 (0.5≤Hc2/Hc1).

Note that Hc2/Hc1 represents the degree of vertical orientation of the magnetic powder, and the degree of vertical orientation of the magnetic powder increases as Hc2/Hc1 is reduced. Hereinafter, the reason why Hc2/Hc1 is used as an index indicating the degree of vertical orientation of the magnetic powder in this embodiment will be described.

In the past, in general, a squareness ratio SQ (=(Mr/Ms)×100, where Mr(emu):residual magnetization, Ms(emu):saturation magnetization) has been used as the index (parameter) indicating the degree of vertical orientation of the magnetic powder. However, in accordance with the findings of the present inventors, the index of the squareness ratio SQ is not suitable as the index indicating the degree of vertical orientation of the magnetic powder for the following reasons.

(1) The squareness ratio SQ fluctuates depending on the value of the coercive force Hc of the magnetic powder. For Example, as shown in FIG. 5, in the case where the coercive force Hc of the magnetic powder increases, apparently, also the value of the squareness ratio SQ increases.

(2) The squareness ratio SQ is affected by distortion of the M-H loop of due to overdispersion.

In this regard, in this embodiment, Hc2/Hc1 is used as an index indicating the degree of orientation of the magnetic powder more appropriately. Since the coercive forces Hc1 and Hc2 simply change depending on the orientation direction of the magnetic powder, Hc2/Hc1 is more appropriate as an index indicating the degree of orientation of the magnetic powder.

(SFD)

In the SFD (Switching Field Distribution) curve of the magnetic recording medium 10, a peak ratio X/Y between a main peak height X and a sub-peak height Y near the zero magnetic field is favorably not less than 3.0, more favorably not less than 5.0, still more favorably not less than 7.0, particularly favorably not less than 10.0, and most favorably not less than 20.0 (see FIG. 5). In the case where the peak ratio X/Y is not less than 3.0, it is possible to prevent the magnetic powder from containing the low coercive force component (e.g., soft magnetic particle or super paramagnetic particle) peculiar to ε-iron oxide a lot in addition to the ε-iron oxide particle that contribute to actual recording. Therefore, since deterioration of the magnetization signal recorded in the adjacent track due to the leakage magnetic field from the recording head can be suppressed, it is possible to achieve more excellent electromagnetic conversion characteristics (e.g., C/N). The upper limit value of the peak ratio X/Y is not particularly limited, but is, for Example, not more than 100.

The above-mentioned peak ratio X/Y is obtained as follows. First, similarly to the above-mentioned method of measuring the coercive force Hc1, the M-H loop after background correction is obtained. Next, an SFD curve is calculated on the basis of the obtained M-H loop. For the calculation of the SFD curve, a program attached to the measurement machine may be used, or another program may be used. Assumption is made that the absolute value of the point at which the calculated SFD curve crosses the Y axis (dM/dH) is "Y" and the height of the main peak seen in the vicinity of the coercive force Hc1 in the M-H loop is "X", the peak ratio X/Y is calculated (Activation Volume $V_{act}$)

An activation volume $V_{act}$ is favorably not more than 8000 $nm^3$, more favorably not more than 6000 $nm^3$, still more favorably not more than 5000 $nm^3$, particularly favorably not more than 4000 $nm^3$, and most favorably not more than 3000 $nm^3$. In the case where the activation volume $V_{act}$ is not more than 8000 $nm^3$, since the dispersion state of the magnetic powder is improved, the bit inversion region can be reduced, and it is possible to prevent the magnetization signal recorded in the adjacent track from being deteriorated due to the leakage magnetic field from the recording head. Therefore, it is possible to achieve more excellent electromagnetic conversion characteristics (e.g., C/N).

The above-mentioned activation volume $V_{act}$ is obtained by the following formula derived by Street&Woolley.

$$V_{act} (nm^3) = k_B \times T \times X_{irr}/(\mu_0 \times Ms \times S)$$

(where $k_B$: Boltzmann's constant ($1.38 \times 10^{-23}$ J/K), T: temperature (K), $X_{irr}$: irreversible magnetic susceptibility, $\mu_0$: vacuum permeability, S: magnetic viscosity coefficient, Ms: saturation magnetization (emu/cm³))

The irreversible magnetic susceptibility $X_{irr}$, the saturation magnetization Ms, and the magnetic viscosity coefficient S substituted into the above-mentioned formula are obtained as follows by using VSM. Note that the measurement direction by VSM is assumed to be the vertical direction. Further, the measurement by VSM is performed on the measurement sample cut out from the elongated magnetic recording medium 10 at 25° C. Further, "demagnetizing field correction" when measuring the M-H loop in the vertical direction is not performed.

(Irreversible Magnetic Susceptibility $X_{irr}$)

The irreversible magnetic susceptibility $X_{irr}$ is defined as the slope in the vicinity of a residual coercive force Hr in the slope of the residual magnetization curve (DCD curve). First, a magnetic field of −1193 kA/m (15 kOe) is applied to the entire magnetic recording medium 10, and the magnetic field is returned to zero, thereby achieving a residual magnetization state. After that, a magnetic field of approximately 15.9 kA/m (200 Oe) is applied in the opposite direction, the magnetic field is returned to zero again, and the amount of residual magnetization is measured. After that, similarly, the measurement in which a magnetic field of 15.9 kA/m larger than the previous applied magnetic field is applied and the magnetic field is returned to zero is repeated, and the amount of residual magnetization is plotted against the applied magnetic field to measure the DCD curve. A point at which the amount of magnetization is zero in the obtained DCD curve is taken as the residual coercive force Hr, and the DCD curve is differentiated to obtain the slope of the DCD curve in each magnetic field. In the slope of the DCD curve, the slope near the residual coercive force Hr is $X_{irr}$.

(Saturation Magnetization Ms)

First, similarly to the above-mentioned method of measuring the coercive force Hc1, the M-H loop after background correction is obtained. Next, on the basis of the value of a saturation magnetization Ms (emu) of the obtained M-H loop and the volume (cm³) of the magnetic layer 13 in the measurement sample, Ms (emu/cm³) is calculated. Note that the volume of the magnetic layer 13 is obtained by multiplying the area of the measurement sample by the average thickness of the magnetic layer 13. The method of calculating the average thickness of the magnetic layer 13 necessary for calculating the volume of the magnetic layer 13 is as described above.

(Magnetic Viscosity Coefficient S)

First, a magnetic field of −1193 kA/m (15 kOe) is applied to the entire magnetic recording medium 10 (measurement sample), and the magnetic field is returned to zero, thereby achieving a residual magnetization state. After that, a magnetic field having a value similar to that of the residual coercive force Hr obtained from the DCD curve is applied in the opposite direction. In the state where the magnetic field is applied, the amount of magnetization is continuously measured at constant time intervals for 1000 seconds. The relationship between a time t and a magnetization amount M(t) thus obtained is compared with the following formula to calculate the magnetic viscosity coefficient S.

$$M(t) = M0 + S \times \ln(t)$$

(where M(t): magnetization amount at time t, M0: initial magnetization amount, S: magnetic viscosity coefficient, ln(t): natural logarithm of time)

1.2 Method of Producing Magnetic Recording Medium

Next, the method of producing the magnetic recording medium 10 having the above-mentioned configuration will be described. First, a nonmagnetic powder, a binder, and the like are kneaded and dispersed in a solvent to prepare a coating material for forming an underlayer. Next, a magnetic powder, a binder, and the like are kneaded and dispersed in a solvent to prepare a coating material for forming a magnetic layer. For the preparation of the coating material for forming a magnetic layer and the coating material for forming an underlayer, for Example, the following solvents, dispersing devices, and kneading devices can be used.

Examples of the solvent used for preparing the above-mentioned coating material include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These may be used alone or mixed appropriately for use.

As the kneading device used for preparing the above-mentioned coating material, for Example, kneading device such as a continuous twin-screw kneader, a continuous twin-screw kneader capable of performing dilution in multi-stages, a kneader, a pressure kneader, and a roll kneader can be used. However, the present technology is not particularly limited to these devices. Further, as the dispersing device used for preparing the above-mentioned coating material, for Example, dispersing devices such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.) a homogenizer, and an ultrasonic dispersion machine can be used. However, the present technology is not particularly limited these devices.

Next, the coating material for forming an underlayer is coated on one main surface of the substrate 11 and dried to form the underlayer 12. Subsequently, the coating material for forming a magnetic layer is coated on the underlayer 12 and dried to form the recording layer 13 on the underlayer 12. Note that during drying, the magnetic field of the magnetic powder may be oriented in the thickness direction of the substrate 11 by, for Example, a solenoid coil. Further, during drying, after the magnetic field of the magnetic powder may be oriented in the travelling direction (longitudinal direction) of the substrate 11 by, for Example, a solenoid coil, the magnetic field of the magnetic powder may be oriented in the thickness direction of the substrate 11. By performing such magnetic field orientation processing, the ratio Hc2/Hc1 can be lowered. Therefore, the degree of vertical orientation of the magnetic powder can be improved. After forming the magnetic layer 13, the back layer 14 is formed on the other main surface of the substrate 11. As a result, the magnetic recording medium 10 is obtained.

The ratio Hc2/Hc1 is set to a desired value by adjusting, for Example, the strength of the magnetic field applied to the coating film of the coating material for forming a magnetic layer, the concentration of solid content in the coating material for forming a magnetic layer, and the drying conditions (drying temperature and drying time) of the coating film of the coating material for forming a magnetic layer. The strength of the magnetic field applied to the coating film is favorably not less than two times and not more than three times the coercive force of the magnetic powder. In order to further increase the ratio Hc2/Hc1, it is favorable to improve the dispersion state of the magnetic powder in the coating material for forming a magnetic layer. Further, in order to further increase the ratio Hc2/Hc1, it is also effective to magnetize the magnetic powder at the stage before the coating material for forming a magnetic layer enters the orientation device for orienting the magnetic field of the magnetic powder. Note that the above-mentioned method of adjusting the ratio Hc2/Hc1 may be used alone or two or more methods may be used in combination.

After that, the obtained magnetic recording medium 10 is rewound into a large diameter core, and curing treatment is performed thereon. Finally, calendaring treatment is performed on the magnetic recording medium 10, and then, it is cut into a predetermined width (e.g., width of ½ inch). In this way, the target elongated magnetic recording medium 10 is obtained.

1.3 Configuration of Recording/Reproduction Apparatus

Next, a configuration of a recording/reproduction apparatus 30 that performs recording and reproduction of the magnetic recording medium 10 having the above-mentioned configuration will be described with reference to FIG. 6.

The recording/reproduction apparatus 30 has a configuration in which a magnetic recording medium cartridge 10A can be loaded. Here, in order to facilitate the description, a case where the recording/reproduction apparatus 30 has a configuration in which one magnetic recording medium cartridge 10A can be loaded will be described. However, the recording/reproduction apparatus 30 may have a configuration in which a plurality of magnetic recording medium cartridges 10A can be loaded.

The recording/reproduction apparatus 30 is connected to information processing apparatuses such as a server 41 and a personal computer (hereinafter, referred to as "PC") 42 via a network 43, and configured to be capable of recording data supplied from these information processing apparatuses in the magnetic recording medium cartridge 10A.

As shown in FIG. 6, the recording/reproduction apparatus 30 includes a spindle 31, a reel 32 on the side of the recording/reproduction apparatus 30, a spindle driving device 33, a reel driving device 34, a plurality of guide rollers 35, a head unit 36, a communication interface (hereinafter, I/F) 37, and a control device 38.

The spindle 31 is configured to be capable of mounting the magnetic recording medium cartridge 10A. The magnetic recording medium cartridge 10A conforms to, for Example, the LTO (Linear Tape Open) standard, and rotatably houses a single reel 10C in which the magnetic recording medium 10 is wound around in a cartridge case 10B. In the magnetic recording medium 10, a V-shaped servo pattern is recorded as a servo signal in advance. The reel 32 is configured to be capable of fixing the tip of the magnetic recording medium 10 pulled out of the magnetic recording medium cartridge 10A.

The spindle driving device 33 is a device that rotationally drives the spindle 31. The reel driving device 34 is a device that rotationally drives the reel 32. When recording data or performing reproduction on the magnetic recording medium 10, the spindle driving device 33 and the reel driving device 34 rotationally drive the spindle 31 and the reel 32, respectively, to cause the magnetic recording medium 10 to travel. The guide roller 35 is a roller for guiding the traveling of the magnetic recording medium 10.

The head unit 36 includes a plurality of recording heads for recording a data signal in the magnetic recording medium 10, a plurality of recording heads for reproducing the data signal recorded in the magnetic recording medium 10, and a plurality of servo heads for reproducing the servo signal recorded in the magnetic recording medium 10. For Example, a ring-type head can be used as the recording head. However, the type of the recording head is not limited thereto.

The communication I/F 37 is for communicating with an information processing apparatus such as the server 41 and the PC 42, and connected to the network 43.

The control device 38 controls the entire recording/reproduction apparatus 30. For Example, the control device 38 records, in response to a request from an information processing apparatus such as the server 41 and the PC 42, the data signal supplied from the information processing apparatus in the magnetic recording medium 10 by the head unit 36. Further, the control device 38 reproduces, in response to a request from the information processing apparatus such as the server 41 and the PC 42, the data signal recorded in the magnetic recording medium 10 by the head unit 36, and supplies it to the information processing apparatus.

1.4 Effect

In the magnetic recording medium 10 according to the first embodiment, (1) the average thickness of the magnetic layer 13 is not more than 90 nm, (2) the average aspect ratio of the magnetic powder is not less than 1.0 and not more than 3.0, (3) the coercive force Hc1 in the vertical direction is not more than 3000 Oe, and (4) the coercive force Hc1 in the vertical direction and the coercive force Hc2 in the longitudinal direction satisfy the relationship of Hc2/Hc1≤0.8. As a result, it is possible to improve the electromagnetic conversion characteristics (e.g., C/N).

1.5 Modified Examples

Modified Example 1

Although the case where the ε-iron oxide particle includes the shell portion 22 having a 2-layer structure has been described in the above-mentioned first embodiment, the ε-iron oxide particle may include a shell portion 23 having a single-layer structure as shown in FIG. 7. In this case, the shell portion 23 has a configuration similar to that of the first shell portion 22a. However, from the viewpoint of suppressing the characteristic deterioration of the ε-iron oxide particle, it is favorable that the ε-iron oxide particle includes the shell portion 22 having a 2-layer structure as in the above-mentioned first embodiment.

Modified Example 2

Although the case where the ε-iron oxide particle has a core-shell structure has been described in the above-mentioned first embodiment, the ε-iron oxide particle may contain an additive instead of the core-shell structure, or may contain additive while having a core-shell structure. In this case, a part of Fe of the ε-iron oxide particle is substituted with an additive. Since the coercive force Hc of the entire ε-iron oxide particle can be adjusted to the coercive force Hc suitable for recording also by the ε-iron oxide particle containing an additive, it is possible to improve the ease of recording. The additive is a metal element other than iron, favorably a trivalent metal element, more favorably at least one of Al, Ga, or In, and still more favorably at least one of Al or Ga.

Specifically, ε-iron oxide containing the additive is an ε-$Fe_{2-x}M_xO3$ crystal (where M represent a metal element other than iron, favorably a trivalent metal element, more favorably at least one of Al, Ga, or In, and still more favorably at least one of Al or Ga. x satisfies the relationship of, for Example, 0<x<1).

Modified Example 3

The magnetic powder may include a powder of nanoparticles (hereinafter, referred to as "hexagonal ferrite particles") containing hexagonal ferrite instead of the powder of the ε-iron oxide particles. The hexagonal ferrite particles each have, for Example, a hexagonal plate shape or a substantially hexagonal plate shape. The hexagonal ferrite favorably contains at least one of Ba, Sr, Pb, or Ca and more favorably at least one of Ba or Sr. The hexagonal ferrite may be specifically, for Example, barium ferrite or strontium ferrite. The barium ferrite may further contain at least one of Sr, Pb, or Ca in addition to Ba. The strontium ferrite may further contain at least one of Ba, Pb, or Ca in addition to Sr.

More specifically, the hexagonal ferrite has an average composition represented by a general formula $MFe_{12}O_{19}$. However, M represents, for Example, at least one metal of Ba, Sr, Pb, or Ca and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the above-mentioned general formula, a part of Fe may be substituted with another metal element.

In the case where the magnetic powder include a powder of the hexagonal ferrite particles, the average particle size of the magnetic powder is favorably not more than 30 nm, more favorably not less than 12 nm and not more than 25 nm, and still more favorably not less than 15 nm and not more than 22 nm. In the case where the average particle size of the magnetic powder is not more than 30 nm, it is possible to achieve favorable electromagnetic conversion characteristics (e.g., C/N) in the magnetic recording medium 10 having a high recording density. Meanwhile, in the case where the average particle size of the magnetic powder is not less than 12 nm, the dispersibility of the magnetic powder is further improved, and more excellent electromagnetic conversion characteristics (e.g., C/N) can be achieved. In the case where the magnetic powder includes a powder of the hexagonal ferrite particles, the average aspect ratio of the magnetic powder is similar to that in the above-mentioned first embodiment.

Note that the average particle size and the average aspect ratio of the magnetic powder are obtained as follows. First, the magnetic recording medium 10 to be measured is processed by using an FIB method or the like to prepare a slice, and the cross section of the slice is observed by TEM. Next, 50 magnetic powders oriented at an angle of 75 degrees or more with respect to the horizontal direction are randomly selected from the captured TEM photograph, and the maximum thickness DA of each magnetic powder is measured. Subsequently, the maximum thicknesses DA of the 50 measured magnetic powders are simply averaged (arithmetic average) to obtain an average maximum thickness DAave.

Next, the surface of the magnetic layer 13 of the magnetic recording medium 10 is observed by TEM. Next, 50 magnetic powders are randomly selected from the captured TEM photograph, and a maximum plate dimeter DB of each magnetic powder is measured. Here, the maximum plate dimeter DB means the largest one (so-called maximum Feret diameter) of distances between two parallel lines drawn from all angles so as to contact the outline of the magnetic powder. Subsequently, the maximum plate dimeters DB of the 50 measured magnetic powders are simply averaged (arithmetic average) to obtain an average maximum plate dimeter DBave. The average maximum plate dimeter DBave thus obtained is taken as the average particle size of the magnetic powder. Next, on the basis of the average maximum thickness DAave and the average maximum plate dimeter DBave, the average aspect ratio (DBave/DAave) of the magnetic powder is obtained.

In the case where the magnetic powder includes a powder of the hexagonal ferrite particles, the average particle volume of the magnetic powder is favorably not more than 5900 $nm^3$, more favorably not less than 500 $nm^3$ and not more than 3400 $nm^3$, and still more favorably not less than 1000 $nm^3$ and not more than 2500 $nm^3$. In the case where the average particle volume of the magnetic powder is not more than 5900 $nm^3$, effects similar to those in the case where the average particle size of the magnetic powder is not more than 30 nm are achieved. Meanwhile, in the case where the average particle volume of the magnetic powder is not less than 500 $nm^3$, effects similar to those in the case where the average particle size of the magnetic powder is not less than 12 nm are achieved.

Note that the average particle volume of the magnetic powder is obtained as follows. First, similarly to the method of calculating the average particle size of the above-mentioned magnetic powder, the average maximum thickness DAave and the average maximum plate dimeter DBave are obtained. Next, an average particle volume V of the magnetic powder is obtained by the following formula.

$$V=3\sqrt{3}/8 \times DAave \times DBave^2$$

Modified Example 4

The magnetic powder may include a powder of nanoparticles (hereinafter, referred to as "cobalt ferrite particles") containing Co-containing spinel ferrite instead of the powder of the ε-iron oxide particle. The cobalt ferrite particle favorably has uniaxial anisotropy. The cobalt ferrite particle has, for Example, a cubic shape or a substantially cubic shape. The Co-containing spinel ferrite may further contain at least one of Ni, Mn, Al, Cu, or Zn in addition to Co.

The Co-containing spinel ferrite has, for Example, an average composition represented by the following formula (1).

$$Co_xM_yFe_2O_z \qquad (1)$$

(where in the formula (1), M represents, for Example, at least one metal of Ni, Mn, Al, Cu, or Zn. x represents a value within the range of not less than 0.4 and not more than 1.0 (0.4≤x≤1.0). y represents a value within the range of not less than 0 and not more than 0.3 (0≤y≤0.3). However, x and y satisfy the relationship of (x+y)≤1.0. z represents a value of not less than 3 and not more than 4 (3≤z≤4). A part of Fe may be substituted with another metal element)

In the case where the magnetic powder includes a powder of the cobalt ferrite particle, the average particle size of the magnetic powder is favorably not more than 25 nm and not more favorably not less than 8 nm and not more than 23 nm. In the case where the average particle size of the magnetic powder is not more than 25 nm, it is possible to achieve favorable electromagnetic conversion characteristics (e.g., C/N) in the magnetic recording medium 10 having a high recording density. Meanwhile, the average particle size of the magnetic powder is not less than 8 nm, the dispersibility of the magnetic powder is improved, and more excellent electromagnetic conversion characteristics (e.g., C/N) can be obtained. In the case where the magnetic powder includes a powder of the cobalt ferrite particle, the average aspect ratio of the magnetic powder is similar to that in the above-mentioned first embodiment. Further, also the method of calculating the average particle size and the average aspect ratio of the magnetic powder is obtained similarly to that in the above-mentioned first embodiment.

The average particle volume of the magnetic powder is favorably not more than 15000 $nm^3$ and more favorably not less than 500 $nm^3$ and not more than 12000 $nm^3$. In the case where the average particle volume of the magnetic powder is not more than 15000 $nm^3$, effects similar to those in the case where the average particle size of the magnetic powder is not more than 25 nm are achieved. Meanwhile, in the case where the average particle volume of the magnetic powder is not less than 500 $nm^3$, effects similar to those in the case where the average particle size of the magnetic powder is not less than 8 nm are achieved. Note that the average particle volume of the magnetic powder is similar to that in the method of calculating the average particle volume of the magnetic powder (method of calculating the average particle volume in the case where the ε-iron oxide particle has a cubic shape or a substantially cubic shape) in the above-mentioned first embodiment.

Modified Example 5

As shown in FIG. 8, the magnetic recording medium 10 may further include a barrier layer 15 provided on at least one surface of the substrate 11. The barrier layer 15 is a layer for suppressing the dimensional change according to the environment of the substrate 11. Although there is hygroscopicity of the substrate 11 as an Example of the cause of the dimensional change, the penetration speed of water to the substrate 11 can be reduced by providing the barrier layer 15. The barrier layer 15 contains, for Example, a metal or metal oxide. As the metal, for Example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta can be used. As the metal oxide, for Example, metal oxide containing one or more of the above-mentioned metals can be used. More specifically, for Example, at least one of $Al_2O_3$, CuO, CoO, $SiO_2$, $Cr_2O_3$, $TiO_2$, $Ta_2O_5$, or $ZrO_2$ can be used. Further, the barrier layer 15 may contain diamond-like carbon (DLC) diamond, or the like.

The average thickness of the barrier layer 15 is favorably not less than 20 nm and not more than 1000 nm and more favorably not less than 50 nm and not more than 1000 nm. The average thickness of the barrier layer 15 is obtained similarly to the average thickness of the magnetic layer 13. However, the magnification of the TEM image is appropriately adjusted in accordance with the thickness of the barrier layer 15.

Modified Example 6

The magnetic recording medium 10 according to the above-mentioned first embodiment may be used for a library apparatus. In this case, the library apparatus may include a plurality of recording/reproduction apparatus 30 in the above-mentioned first embodiment.

2 Second Embodiment (Expansion/Contraction Properties and Tension Control of Magnetic Recording Medium)

The expansion/contraction properties of the magnetic recording medium 10 and tension control of the magnetic recording medium 10 by the recording/reproduction apparatus 30 will be described below. In the LTO standard, the number of recording tracks has rapidly increased due to the demand for high-density recording of data. In such a case, the recording track width is narrowed, and slight fluctuation in the width of the magnetic recording medium 10 causes a problem in some cases.

For Example, assumption is made that predetermined data is stored in the magnetic recording medium 10 by the recording/reproduction apparatus 30, and then (e.g., after preservation for a certain period), the data recorded in the magnetic recording medium 10 is reproduced by the recording/reproduction apparatus 30. In such a case, if the width of the magnetic recording medium 10 at the time of data reproduction fluctuates even slightly as compared with the width of the magnetic recording medium 10 at the time of data recording, there is a possibility that off track (data read head is positioned on an incorrect recording track) occurs. For this reason, there is a possibility that an error occurs because the data recorded in the magnetic recording medium 10 cannot be accurately reproduced.

Examples of the cause of fluctuation of the width of the magnetic recording medium 10 include fluctuation of temperature and fluctuation of humidity. In general, a method of coping with the fluctuation of the width of the magnetic recording medium 10 by designing the magnetic recording medium 10 so as not to expand and contract is used. However, it is practically impossible to make the magnetic recording medium 10 not expand and contract at all.

In this regard, in this embodiment, a method of making it easy for the magnetic recording medium 10 to expand and contract to some extent rather than making it hard for the magnetic recording medium 10 to expand and contract, and controlling (increasing or decreasing) tension (transport direction of the magnetic recording medium 10) of the magnetic recording medium 10 on the side of the recording/reproduction apparatus 30 is used. That is, in this embodiment, the magnetic recording medium 10 is configured to have a width that is adjustable by increasing or decreasing tension in the longitudinal direction.

specifically, the recording/reproduction apparatus 30 reduces the width of the magnetic recording medium 10 by increasing tension in the longitudinal direction of the magnetic recording medium 10 at the time of reproduction of a data signal as necessary (in the case where the width of the magnetic recording medium 10 is widened). Further, the recording/reproduction apparatus 30 increases the width of the magnetic recording medium 10 by reducing the tension in the longitudinal direction of the magnetic recording medium 10 at the time of reproduction of a data signal as necessary (in the case where the width of the magnetic recording medium 10 is narrowed). Note that the recording/reproduction apparatus 30 may control the tension in the longitudinal direction of the magnetic recording medium 10 not only at the time of reproduction of a data signal but also recording of a data signal.

In accordance with such a method, for Example, it is possible to make the width of the magnetic recording medium 10 constant by adjusting, when the width of the magnetic recording medium 10 fluctuates due to temperature or the like, the width of the magnetic recording medium 10 as necessary. Therefore, it is considered to be possible to suppress off track and accurately reproduce the data recorded in the magnetic recording medium 10.

(Load when Magnetic Recording Medium is Elongated by 1% in Longitudinal Direction)

A load [N] (hereinafter, referred to simply as "longitudinal 1% elongation load") when the magnetic recording medium 10 is elongated by 1% in the longitudinal direction is favorably not more than 0.6 N, more favorably not more than 0.58 N, still more favorably not more than 0.55 N, particularly favorably not more than 0.5 N, and most favorably not more than 0.45 N. In the case where the longitudinal 1% elongation load is not more than 0.6 N, the adjustment of the width of the magnetic recording medium 10 by tension control is easy because the expansion/contraction properties of the magnetic recording medium 10 increases. Therefore, even if the width of the magnetic recording medium 10 fluctuates due to temperature or the like (e.g., under an accelerated deterioration environment such as 45° C. for one month), it is possible to make the width of the magnetic recording medium 10 constant by adjusting the width of the magnetic recording medium 10. Therefore, it is possible to suppress off track, and accurately reproduce data recorded in the magnetic recording medium 10.

Further, since it is possible to cope with slight fluctuation of the width of the magnetic recording medium 10, as a result, the number of recording tracks of the magnetic recording medium 10 can be increased, and high-density recording of data can be achieved.

The above-mentioned longitudinal 1% elongation load is obtained as follows. First, by cutting the magnetic recording medium 10 having a tape width of 12.65 mm into a length of 100 mm (in the longitudinal direction) to prepare a sample of the magnetic recording medium 10 having a width of 12.65 mm and a length of 100 mm. Then, this sample is set in a measurement machine, the sample is elongated in the longitudinal direction by the measurement machine, and the load at this time is measured. As the measurement machine, AUTO GRAPH AG-100D manufactured by Shimadzu Corporation is used. Further, the measurement temperature is a room temperature, and the tensile rate is 10 mm/min.

FIG. 10 is a diagram showing the relationship between the elongation rate [%] in the longitudinal direction and the load [N]. As shown in FIG. 10, the relationship between the elongation rate and the load is non-linear in the case where the sample is hardly elongated (when the elongation rate is close to zero), and substantially linear in the case where the sample is elongated to some extent. Therefore, as the value of the longitudinal 1% elongation load, not a value at a non-linear part but a value at a substantially linear part is used.

Specifically, in a tensile test of the magnetic recording medium 10 in the longitudinal direction, the longitudinal 1% elongation load is represented by the following formula, a load at the time of the elongation rate of 0.5% of the magnetic recording medium 10 is represented by $\sigma 0.5$ [N] and a load at the time of the elongation rate of 1.5% of the magnetic recording medium 10 is represented by $\sigma 1.5$ [N].

Longitudinal 1% elongation load [N]=$\sigma 1.5 - \sigma 0.5$

This longitudinal 1% elongation load is a value indicating the difficulty of expansion and contraction in the longitudinal direction of the magnetic recording medium 10 due to external force. As the value is larger, the magnetic recording medium 10 is less likely to expand and contract in the longitudinal direction due to external force. As the value is smaller, the magnetic recording medium 10 is more likely to expand and contract in the longitudinal direction due to external force.

Note that although the longitudinal 1% elongation load is a value relating to the longitudinal direction of the magnetic recording medium 10, it also has a correlation with the difficulty of expansion and contraction in the width direction of the magnetic recording medium 10. That is, as the value of longitudinal 1% elongation load is larger, the magnetic recording medium 10 is less likely to expand and contract in the width direction due to external force. As the value is smaller, the magnetic recording medium 10 is more likely to expand and contract in the width direction due to external force.

Since it is easier to adjust the width of the magnetic recording medium 10 by tension control as the magnetic recording medium 10 is more likely to expand and contract in the width direction, it is advantageous that the longitudinal 1% elongation load is small.

(Contraction Ratio in Longitudinal Direction of Magnetic Recording Medium 10)

The contraction ratio in the longitudinal direction of the magnetic recording medium 10 (hereinafter, referred to simply as "longitudinal contraction ratio") is favorably not more than 0.1%, more favorably not more than 0.09%, not more than 0.08%, not more than 0.07%, not more than 0.06%, or not more than 0.05%. In the case where the longitudinal contraction ratio is not more than 0.1%, the width of the magnetic recording medium 10 does not easily fluctuate due to temperature or the like (e.g., even under a long-term accelerated deterioration environment such as 45° C. for one month). Therefore, it is possible to suppress off track, and accurately reproduce the data recorded in the magnetic recording medium 10.

Note that in this embodiment, the magnetic recording medium 10 configured to be not easily expanded and contracted due to an environmental change such as temperature fluctuation while the magnetic recording medium 10 is relatively easily expanded and contracted when external force is applied (tension control).

The above-mentioned longitudinal contraction ratio is obtained as follows. First, the magnetic recording medium 10 is cut into a length of 50 mm (in the longitudinal direction) to prepare a sample of the magnetic recording medium 10. Then, two points of indentation are made with a needle at positions 15 mm away in the longitudinal direction on the surface of the magnetic layer 13 of this sample.

Next, by using a measurement microscope TMU-220 ES and coordinate measurement machine CA-1B manufactured by TOPCON CORPORATION, a distance L1 between the two points of indentation is measured at room temperature. After that, the sample is preserved (aged) for 72 hours in a thermostatic chamber at 60° C. and in a 10% RH state while no tension is applied to the sample (tension free). After that, the sample is taken out of the thermostatic chamber, left to stand for one hour in a room temperature environment, and a distance L2 between two points of indentation is measured by a method similar to that described above.

Then, on the basis of the distance L1 (before aging) and the distance L2 (after aging), the longitudinal contraction ratio [%] is obtained by the following formula.

$$\text{Longitudinal contraction ratio} = \{(L1-L2)/L1\} \times 100$$

This longitudinal contraction ratio is a value indicating the ease of expansion and contraction in the longitudinal direction of the magnetic recording medium 10 due to heat in a tension free state. As the value is larger, the magnetic recording medium 10 is more likely to expand and contract in the longitudinal direction due to heat. As the value is smaller, the magnetic recording medium 10 is less likely to expand and contract in the longitudinal direction due to heat.

Note that although the longitudinal contraction ratio is a value relating to the longitudinal direction of the magnetic recording medium 10, it also has a correlation with the ease of expansion and contraction in the width direction of the magnetic recording medium 10. That is, as the value of the longitudinal contraction ratio is larger, the magnetic recording medium 10 is more likely to expand and contract in the width direction due to heat. As the value is smaller, the magnetic recording medium 10 is less likely to expand and contract in the width direction due to heat.

As described above, from the viewpoint of tension control, it is advantageous for the magnetic recording medium 10 to expand and contract. Meanwhile, expansion and contraction of the magnetic recording medium 10 due to an environmental change such as a temperature change is not favorable because it induces off track. Therefore, it is advantageous that the longitudinal contraction ratio is small.

((TL−TB)/TB)

When the average thickness of the substrate 11 is represented by TB and the average thickness of the magnetic recording medium 10 is represented by TL, the value of (TL−TB)/TB is favorably not more than 0.41, more favorably not more than 0.39, still more favorably not more than 0.37, and particularly favorably not more than 0.35. In the case where the value of (TL−TB)/TB is not more than 0.41, since expansion/contraction properties of the magnetic recording medium 10 due to external force are further improved, the width of the magnetic recording medium 10 can be more easily adjusted by tension control. Therefore, it is possible to further appropriately suppress off track, and further accurately reproduce the data recorded in the magnetic recording medium 10.

The denominator of (TL−TB)/TB represents an average thickness TB the substrate 11, and the numerator represents an average thickness (TL−TB) of the coating films (the magnetic layer 13, the underlayer 12, and the back layer 14). Note that the average thickness of the coating films is obtained by subtracting the average thickness TB of the substrate 11 from an average thickness TL of the magnetic recording medium 10. That is, (TL−TB)/TB means a ratio of the average thickness (TL−TB) of the coating films to the average thickness TB of the substrate 11. Here, the coating films are less likely to expand and contract due to external force as compared with the substrate 11. If the average thickness TB of the substrate 11 is fixed and the average thickness (TL−TB) of the coating films is increased, the value of (TL−TB)/TB increases. In this case, the magnetic recording medium 10 is less likely to expand and contract.

The value of (TL−TB)/TB has a correlation with the difficulty of expansion and contraction of the magnetic recording medium 10 due to external force. As the value is larger, the magnetic recording medium 10 is less likely to expand and contract due to external force. As the value is smaller, the magnetic recording medium 10 is more likely to expand and contract due to external force. Therefore, from the viewpoint of tension control, it is advantageous that the value of (TL−TB)/TB is small.

(Young's Modulus in Longitudinal Direction of Magnetic Recording Medium)

The Young's modulus in the longitudinal direction of the magnetic recording medium 10 is favorably not more than 8.5 GPa, more favorably not more than 8.3 GPa, still more favorably not more than 7.9 GPa, particularly favorably not more than 7.5 GPa, and most favorably not more than 7.1 GPa. In the case where the Young's modulus in the longitudinal direction of the magnetic recording medium 10 is not more than 8.5 GPa, since expansion/contraction properties of the magnetic recording medium 10 due to external force are further improved, the width of the magnetic recording medium 10 can be more easily adjusted by tension control. Therefore, it is possible to further appropriately suppress off track, and further accurately reproduce the data recorded in the magnetic recording medium 10.

The Young's modulus in the longitudinal direction of the magnetic recording medium 10 is a value indicating the difficulty of expansion and contraction in the longitudinal direction of the magnetic recording medium 10 due to external force. As the value is larger, the magnetic recording medium 10 is less likely to expand and contract in the longitudinal direction due to external force. As the value is smaller, the magnetic recording medium 10 is more likely to expand and contract in the longitudinal direction due to external force.

Note that although the Young's modulus in the longitudinal direction of the magnetic recording medium 10 is a value relating to the longitudinal direction of the magnetic recording medium 10, it also has a correlation with the difficulty of expansion and contraction in the width direction of the magnetic recording medium 10. That is, as the value is larger, the magnetic recording medium 10 is less likely to expand and contract in the width direction due to external force. As the value is smaller, the magnetic recording medium 10 is more likely to expand and contract in the width direction due to external force. Therefore, from the viewpoint of tension control, it is advantageous that the Young's modulus in the longitudinal direction of the magnetic recording medium 10 is small.

The above-mentioned Young's modulus in the longitudinal direction of the magnetic recording medium 10 is measured by using a tensile tester (AG-100D manufactured by Shimadzu Corporation). The magnetic recording medium 10 is cut into a length of 180 mm to prepare a measurement sample. A jig capable of fixing the width (½ inch) of the measurement sample is attached to the above-mentioned tensile tester, and the top and bottom of the measurement sample are fixed. The distance is set to 100 mm. After chucking the measurement sample, stress is gradually applied in the direction in which the measurement sample is pulled. The tensile rate is set to 0.1 mm/min. On the basis of the change in stress and the amount of elongation at this time, the Young's modulus is calculated using the following formula.

$$E = (\Delta N/S)/(\Delta x/L) \times 10^{-3}$$

ΔN: Change in stress (N)
S: Cross-sectional area (mm²) of test piece
Δx: Amount of elongation (mm)
L: Distance between gripping jigs (mm)

The range of stress is 0.5 N to 1.0 N, and the change in stress (ΔN) and the amount of elongation (Δx) at this time are used for calculation.

(Young's Modulus in Longitudinal Direction of Substrate 11)

The Young's modulus in the longitudinal direction of the substrate 11 is favorably not more than 8.0 GPa, more favorably not more than 7.8 GPa, still more favorably not more than 7.4 GPa, particularly favorably not more than 7.0 GPa, and most favorably not more than 6.4 GPa. In the case where the Young's modulus in the longitudinal direction of the substrate 11 is not more than 8.0 GPa, since the expansion/contraction properties of the magnetic recording medium 10 due to external force are further improved, the width of the magnetic recording medium 10 can be more easily adjusted by tension control. Therefore, it is possible to further appropriately suppress off track, and further accurately reproduce the data recorded in the magnetic recording medium 10.

The above-mentioned Young's modulus in the longitudinal direction of the substrate 11 is obtained as follows. First, the underlayer 12, the magnetic layer 13, and the back layer 14 are removed from the magnetic recording medium 10 to obtain the substrate 11. This substrate 11 is used for obtaining the Young's modulus in the longitudinal direction of the substrate 11 by a procedure similar to that of the Young's modulus in the longitudinal direction of the magnetic recording medium 10.

The thickness of the substrate 11 occupies more than half of the total thickness of the magnetic recording medium 10. Therefore, the Young's modulus in the longitudinal direction of the substrate 11 has a correlation with the difficulty of expansion and contraction of the magnetic recording medium 10 due to external force. As the value is larger, the magnetic recording medium 10 is less likely to expand and contract in the width direction due to external force. As the value is smaller, the magnetic recording medium 10 is more likely to expand and contract in the width direction due to external force.

Note that although the Young's modulus in the longitudinal direction of the substrate 11 is a value relating to the longitudinal direction of the magnetic recording medium 10, it also has a correlation with the difficulty of expansion and contraction in the width direction of the magnetic recording medium 10. That is, as the value is larger, the magnetic recording medium 10 is less likely to expand and contract in the width direction due to external force. As the value is smaller, the magnetic recording medium 10 is more likely to expand and contract in the width direction due to external force. Therefore, from the viewpoint of tension control, it is advantageous that the Young's modulus in the longitudinal direction of the substrate 11 is small.

(Average Thickness of Magnetic Recording Medium)

The average thickness TL of the magnetic recording medium 10 is favorably not more than 5.6 μm, more favorably not more than 5.0 μm, still more favorably not more than 4.6 μm, and particularly favorably not more than 4.4 μm. In the case where the average thickness TL of the magnetic recording medium 10 is not more than 5.6 μm, since expansion/contraction properties of the magnetic recording medium 10 due to external force are further improved, the width of the magnetic recording medium 10 can be more easily adjusted by tension control. Therefore, it is possible to further appropriately suppress off track, and further accurately reproduce the data recorded in the magnetic recording medium 10.

The above-mentioned average thickness of the magnetic recording medium 10 is obtained similarly to the method of measuring the average thickness of the magnetic recording medium 10 described in the first embodiment.

The average thickness of the magnetic recording medium 10 has a correlation with the ease of expansion and contraction of the magnetic recording medium 10 due to external force. As the average thickness of the magnetic recording medium 10 is smaller, the magnetic recording medium 10 is more likely to expand and contract due to external force. As the average thickness is larger, the magnetic recording medium 10 is less likely to expand and contact due to external force. Therefore, from the viewpoint of tension control, it is advantageous that the average thickness of the magnetic recording medium 10 is small.

(Average Thickness of Substrate)

The average thickness TB of the substrate 11 is favorably not more than 4.2 μm, more favorably not more than 3.8 μm, and still more favorably not more than 3.4 μm. In the case where the average thickness TB of the substrate 11 is not more than 4.2 μm, since expansion/contraction properties of the magnetic recording medium 10 due to external force are further improved, the width of the magnetic recording medium 10 can be more easily adjusted by tension control. Therefore, it is possible to further appropriately suppress off track, and further accurately reproduce the data recorded in the magnetic recording medium 10.

The average thickness of the substrate 11 is obtained similarly to the method of measuring the average thickness of the substrate 11 described in the first embodiment.

The thickness of the substrate 11 occupies more than half of the total thickness of the magnetic recording medium 10. Therefore, the average thickness of the substrate 11 has a correlation with the ease of expansion and contraction of the magnetic recording medium 10 due to external force. As the average thickness of the substrate 11 is smaller, the magnetic recording medium 10 is more likely to expand and contract due to external force. As the average thickness is larger, the magnetic recording medium 10 is less likely to expand and contract due to external force. Therefore, from the viewpoint of tension control, it is advantageous that the average thickness of the substrate 11 is small.

(Recording/Reproduction Apparatus)

The control device 38 obtains, when recording data in the magnetic recording medium 10, a distance (distance in the width direction of the magnetic recording medium 10) d1 between two adjacent servo bands SB from the reproduced waveform of the serve signal read from the two adjacent servo bands SB. Then, it stores the obtained distance in a storage unit of the control device 38.

The control device 38 obtains, when reproducing the data from the magnetic recording medium 10, a distance (distance in the width direction of the magnetic recording medium 10) d2 between two adjacent servo bands SB from the reproduced waveform of the serve signal read from the two adjacent servo bands SB. At the same time, the control device 38 reads, from the storage unit, the distance d1 between the two adjacent servo bands SB obtained when recording the data in the magnetic recording medium 10. The control device 38 controls rotation of the spindle driving device 33 and the reel driving device 34 so that a difference Δd between the distance d1 between the servo bands SB obtained when recording the data in the magnetic recording medium 10 and the distance d2 between the servo bands SB obtained when reproducing the data from the magnetic recording medium 10 is within a specified range to adjust the tension applied in the longitudinal direction of the magnetic recording medium 10. The control of tension adjustment is performed by, for Example, feedback control.

Note that the control device 38 may store, in the storage unit in advance, a distance d3 between known servo bands SB as a reference when adjusting the tension in the longitudinal direction of the magnetic recording medium 10 instead of obtaining the distance d1 between the servo bands SB when recording the data in the magnetic recording medium 10. In this case, the control device 38 controls rotation of the spindle driving device 33 and the reel driving device 34 so that the difference Δd between the distance d3 between the servo bands SB stored in the storage unit in advance and the distance d2 between the servo bands SB obtained when reproducing the data from the magnetic recording medium 10 is within a specified range to adjust applied the tension in the longitudinal direction of the magnetic recording medium 10.

EXAMPLES

Hereinafter, the present disclosure will be specifically described by way of Examples. However, the present disclosure is not limited to only these Examples.

In this Example, the average thickness of a base film (substrate), the average thickness of a magnetic layer, the average thickness of an underlayer, the average thickness of a back layer, the average thickness of a magnetic tape (magnetic recording medium), the average aspect ratio of a magnetic powder, the average particle size of the magnetic powder, the average particle volume of the magnetic powder, the coercive force Hc1 of the magnetic tape in the vertical direction, the coercive force Hc2 of the magnetic tape in the longitudinal direction, and the servo band width $W_{SB}$ are obtained by the measurement method described in the first embodiment.

In this Example, the longitudinal 1% elongation load of the magnetic tape, the longitudinal contraction ratio of the magnetic tape, the average thickness TL of the magnetic tape, the average thickness TB of the base film, (TL−TB)/TB, the Young's modulus in the longitudinal direction of the magnetic tape, and the Young's modulus in the longitudinal direction of the base film are obtained by the measurement method described in the above-mentioned second embodiment.

Examples 1 to 9, Comparative Examples 1 to 6

(Step of Preparing Coating Material for Forming Magnetic Layer)

A coating material for forming a magnetic layer was prepared as follows. First, a first composition having the following formulation was kneaded by an extruder. Next, the kneaded first composition and a second composition having the following formulation were added to a stirring tank including a dispersing device, and, premixed. Subsequently, further sand mill mixing was performed, and filter treatment was performed to prepare a coating material for forming a magnetic layer.

(First Composition)

Magnetic powder: 100 parts by mass

Vinyl chloride resin (Cyclohexanone solution 30 mass %): 10 parts by mass (Degree of polymerization 300, Mn=10000, containing $OSO_3K$=0.07 mmol/g and secondary OH=0.3 mmol/g as polar groups)

Aluminum oxide powder: 5 parts by mass ($\alpha$-$Al_2O_3$, average particle diameter 0.2 μm)

Carbon black: 2 parts by mass (Manufactured by TOKAI CARBON CO., LTD., trade name: SEAST TA)

Note that as the magnetic powder, those shown in Table 1 were used.

(Second Composition)

Vinyl chloride resin: 1.1 parts by mass (Resin solution: resin content 30 mass %, cyclohexanone 70 mass %)

n-butyl stearate: 2 parts by mass

Methyl ethyl ketone: 121.3 parts by mass

Toluene: 121.3 parts by mass

Cyclohexanone: 60.7 parts by mass

Finally, as curing agents, polyisocyanate (trade name: Coronate L manufactured by Nippon Polyurethane Industry Co., Ltd.): 4 parts by mass and myristic acid: 2 parts by mass are added to the coating material for forming a magnetic layer prepared as described above.

(Step of Preparing Coating Material for Forming Underlayer)

The coating material for forming an underlayer was prepared as follows. First, a third composition having the following formulation was kneaded by an extruder. Next, the kneaded third composition and a fourth composition having the following formulation were added to a stirring tank including a dispersion device, and premixed. Subsequently, further sand mill mixing was performed, and filter treatment was performed to prepare a coating material for forming an underlayer.

(Third Composition)

Acicular iron oxide powder: 100 parts by mass ($\alpha$-$Fe_2O_3$, average major axis length 0.15 μm)

Vinyl chloride resin: 55.6 parts by mass (Resin solution: resin content 30 mass %, cyclohexanone 70 mass %)

Carbon black: 10 parts by mass (Average particle diameter 20 nm)

(Fourth Composition)

Polyurethane resin UR 8200 (manufactured by TOYOBO CO., LTD.): 18.5 parts by mass n-butyl stearate: 2 parts by mass Methyl ethyl ketone: 108.2 parts by mass Toluene: 108.2 parts by mass Cyclohexanone: 18.5 parts by mass Finally, as curing agents, polyisocyanate (trade name: Coronate L manufactured by Nippon Polyurethane Industry Co., Ltd.): 4 parts by mass and myristic acid: 2 parts by mass are added to the coating material for forming an underlayer prepared as described above.]

(Step of Preparing Coating Material for Forming Back Layer)

A coating material for forming a back layer was prepared as follows. The following raw materials were mixed in a stirring tank including a dispersion device, and filter treatment was performed to prepare the coating material for forming a back layer.

Carbon black (manufactured by ASAHI CARBON CO., LTD, trade name: #80): 100 parts by mass Polyester polyurethane: 100 parts by mass (Manufactured by Nippon Polyurethane Industry Co., Ltd., trade name: N-2304)

Methyl ethyl ketone: 500 parts by mass

Toluene: 400 parts by mass

Cyclohexanone: 100 parts by mass (Step of Deposition)

By using the coating materials prepared as described above, a magnetic tape having a medium configuration 1 was prepared as follows. First, an elongated PEN film (base film) having the average thickness of 4.0 µm was prepared as a support. Next, the coating material for forming an underlayer was coated on one main surface of the PEN film and dried to form an underlayer having the average thickness of 1.0 to 1.1 µm on the one main surface of the PEN film. Next, the coating material for forming a magnetic layer was coated on the underlayer and dried to form a magnetic layer having the average thickness of 60 to 100 nm on the underlayer. Note that during drying of the coating material for forming a magnetic layer, the magnetic field of the magnetic powder was oriented in the thickness direction of the PEN film by a solenoid coil. Specifically, the magnetic field of the magnetic powder was once oriented in the traveling direction (in the longitudinal direction) of the PEN film by a solenoid coil, and then oriented in the thickness direction of the PEN film. Further, the drying conditions (drying temperature and drying time) of the coating material for forming a magnetic layer are adjusted, and the coercive force Hc1 in the vertical direction, the coercive force Hc2 in the longitudinal direction, and Hc2/Hc1 were respectively set to 2450 to 3100 Oe, 1820 to 2080 Oe, and 0.65 to 0.85.

Subsequently, the coating material for forming a back layer was coated on the other main surface of the PEN film on which the underlayer and the magnetic layer were formed and dried to form a back layer having the average thickness of 0.4 µm. Then, curing treatment was performed on the PEN film on which the underlayer, the magnetic layer, and the back layer were formed. After that, calendaring treatment was performed to smooth the surface of the magnetic layer.

(Step of Cutting)

The magnetic tape obtained as described above was cut into a width of ½ inch (12.65 mm). As a result, an elongated magnetic tape having the average thickness of 5.6 µm was obtained.

(Writing Servo Signal and Data Signal)

A servo signal and a data signal were written as follows to the elongated magnetic tape obtained as described above. First, by writing a servo signal to the magnetic tape by using a servo writer, five servo bands each having the servo band width $W_{SB}$ of 96 µm were formed. Note that by writing the servo signal, a series of V-shaped magnetic patterns were formed in each servo band.

Next, by using a recording/reproduction apparatus, a data signal was written to a data band between the servo band. At this time, the recording/reproduction apparatus was controlled so as to achieve a single recording wavelength having a recording track width W of 2.9 µm and a recording wavelength λ of 0.208 µm. Note that the recording wavelength λ [nm] of the data signal is four times the magnetization reversal pitch L [nm] (=0.052 µm) at the time of recording at the shortest recording wavelength (i.e., shortest recording wavelength L'=2×L, and the recording wavelength λ=(double length of L')). A ring head having a gap length of 0.2 µm was used as the recording head.

Here, the reason why the recording wavelength λ is twice the shortest recording wavelength L' is as follows. That is, in a recording/reproduction system using a short wavelength, in general, an output/noise ratio at the time of recording/reproduction at a recording wavelength twice the shortest recording wavelength is often used as C/N. Further, C/N at the doubled recording wavelength has a high correlation with an error rate as compared with C/N at the shortest recording wavelength. Further, in the case where C/N was measured at the shortest recording wavelength, depending on the wavelength characteristics of the recording/reproduction system, tape noise is hidden by system noise of the recording/reproduction system, and noise characteristics of the medium are not correctly reflected in some cases. In particular, in the case of recording with high linear recording density, the noise characteristics of the medium are not correctly reflected in many cases.

The minimum value L of the magnetization reversal pitch and the width W of each of the data tracks were obtained as follows. First, the surface of the magnetic layer 13 was observed using a magnetic force microscope (MFM) to acquire an MFM image. In Part A of FIG. 9 and Part B of FIG. 9, an example of the MFM image is shown. Next, the dimension of a series of magnetic patterns in the width direction of the magnetic tape was measured from the acquired MFM image to achieve the track width W [nm]. Further, the distance between a bright part and a dark part or distance between a dark part and a dark part in the longitudinal direction of the magnetic tape was taken as λ [nm]. After that, a half value of λ [nm] was taken as L' [nm], and a half of L' [nm] was taken as L [nm].

Example 10

A magnetic tape having a medium configuration 2 was obtained similarly to Example 1 except for the following points. That is, the recording/reproduction apparatus was controlled so that the recording track width W was 1.5 µm and the recording wavelength λ was a single recording wavelength of 0.192 µm. Note that the recording wavelength λ [nm] of the data signal was four times the magnetization reversal pitch L [nm] (=0.048 µm) at the time of recording at the shortest recording wavelength.

Example 11

A magnetic tape having a medium configuration 3 was obtained similarly to Example 2 except for the following points. That is, a PEN film having the average thickness of 3.6 µm was used as a support, and the average thickness of the magnetic tape was 5.2 µm. Further, the recording/reproduction apparatus was controlled so that the recording track width W was 0.95 µm and the recording wavelength λ was a single recording wavelength of 0.168 µm. Note that the recording wavelength λ [nm] of the data signal was four times the magnetization reversal pitch L [nm] (=0.042 µm) at the time of recording at the shortest recording wavelength.

Example 12

A magnetic tape having a medium configuration 4 was obtained similarly to Example 8 except for the following points. That is, a PEN film having the average thickness of 3.6 µm was used as a support, and the average thickness of the magnetic tape was 5.2 µm. Further, nine servo bands each having the servo band width $W_{SB}$ of 96 µm were formed. Further, the recording/reproduction apparatus was controlled so that the recording track width W was 0.51 μm and the recording wavelength λ was a single recording wavelength of 0.156 μm. Note that the recording wavelength λ [nm] of the data signal was four times the magnetization reversal pitch L [nm] (=0.039 μm) at the time of recording at the shortest recording wavelength.

Example 13

A tape having a medium configuration 5 was obtained similarly to Example 8 except for the following points. That is, a PEN film having the average thickness of 3.1 μm was used as a support, and the average thickness of the magnetic tape was set to 4.5 μm. Further, nine servo bands each having the servo band width $W_{SB}$ of 96 μm were formed. Further, the recording/reproduction apparatus was controlled so that the recording track width W was 0.83 μm and the recording wavelength λ was a single recording wavelength of 0.156 μm. Note that the recording wavelength λ [nm] of the data signal was four times the magnetization reversal pitch L [nm] (=0.039 μm) at the time of recording at the shortest recording wavelength.

Example 14

A magnetic tape having a medium configuration 6 was obtained similarly to Example 9 except for the following points. That is, a PEN film having the average thickness of 3.1 μm was used as a support, and the average thickness of the magnetic tape was set to 4.5 μm. Further, nine servo bands each having the servo band width $W_{SB}$ of 96 μm were formed. Further, the recording/reproduction apparatus was controlled so that the recording track width W was 0.63 μm and the recording wavelength λ was a single recording wavelength of 0.152 μm. Note that the recording wavelength λ [nm] of the data signal was four times the magnetization reversal pitch L [nm] (=0.038 μm) at the time of the shortest recording wavelength.

Example 15

A magnetic tape having the medium configuration 1 was obtained similarly to Example 1 except for the following points. That is, the coating thickness of the coating material for forming a magnetic layer was adjusted to form a magnetic layer having the average thickness of 90 nm on the underlayer. Further, the dispersion conditions of the coating material for forming a magnetic layer and the drying conditions (drying temperature and drying time) of the coating material for forming a magnetic layer were adjusted to respectively set the coercive force Hc1 in the vertical direction, the coercive force Hc2 in the longitudinal direction, and Hc2/Hc1 to 2990 Oe, 1500 Oe, and 0.50.

Example 16

A magnetic tape having the medium configuration 1 was obtained similarly to Example 1 except for the following points. That is, the drying conditions (drying temperature and drying time) of the coating material for forming a magnetic layer were adjusted to respectively set the coercive force Hc1 in the vertical direction, the coercive force Hc2 in the longitudinal direction, and Hc2/Hc1 to 2690 Oe, 2150 Oe, and 0.80.

Example 17

A magnetic tape having the medium configuration 1 was obtained similarly to Example 6 except for the following points. That is, the coating thickness of the coating material for forming a magnetic layer was adjusted to form a magnetic layer having the average thickness of 90 nm on the underlayer. Further, the drying conditions (drying temperature and drying time) of the coating material for forming a magnetic layer were adjusted to respectively set the coercive force Hc1 in the vertical direction, the coercive force Hc2 in the longitudinal direction, and Hc2/Hc1 to 2900 Oe, 1950 Oe, and 0.67.

Example 18 and Comparative Examples 1 to 9

As shown in Table 2, magnetic tapes were obtained similarly to Example 1 except that each parameter of the magnetic tapes and each parameter of the PEN films (base films) were set.

(C/N)

First, a reproduction signal of the magnetic tape was obtained using a loop tester (manufactured by MicroPhysics, Inc.). The conditions for acquiring the reproduction signal are as follows.
head: GMR head
speed: 2 m/s
signal: Single recording frequency (10 MHz)
Recording current: Optimal recording current Next, the reproduction signal was taken in by a spectrum analyzer (spectrum analyze), the reproduction output value of 10 MHz and the average value of noise of 10 MHz±1 MHz were measured, and the difference between them was used as C/N. The results were shown in Table 1 as relative values with C/N in Comparative Example 1 as 0 dB. Note that if C/N is not less than 1.5 dB, a medium capable of withstanding short wavelength and narrow track density can be realized.

(Determination of Amount of Change in Tape Width)

First, a cartridge sample into which a magnetic tape having a width of ½ inch was incorporated was prepared. The above-mentioned magnetic tape was wound around a reel provided in a cartridge case, and housed in the cartridge sample. Note that in the magnetic tape, two or more rows of a series of V-shaped magnetic patterns were recorded in advance in parallel with the longitudinal direction at known intervals (hereinafter, referred to as "intervals of the series of known magnetic patterns at the time of pre-recording"). Next, the cartridge sample was reciprocated in the recording/reproduction apparatus. Then, the above-mentioned two or more rows of the series of V-shaped magnetic patterns were simultaneously reproduced at the time of reciprocation, and the intervals between the series of magnetic patterns at the time of travelling were continuously measured from the shape of the reproduced waveform of the respective rows. Note that the rotational driving of the spindle driving device and the reel driving device was controlled at the time of travelling on the basis of the information regarding the measured intervals between the series of magnetic patterns, and tension in the longitudinal direction of the magnetic tape was automatically adjusted so that the intervals between the series of magnetic patterns were specified widths or substantially specified widths. All the measurement values of the series of magnetic patterns corresponding to one reciprocation were used as the "measured intervals of the series of magnetic patterns", and the maximum value of the difference between this and the "known intervals between the series of magnetic patterns at the time of pre-travelling" was used as the "change in tape width".

Further, the reciprocation by the recording/reproduction apparatus was performed in a constant temperature humidity chamber. The speed of the reciprocation was 5 m/sec. In accordance with an environmental change program (change from 10° C. 10% to 29° C. 80% and then to 10° C. 10% repeated twice. Change from 10° C. 10% to 29° C. 80% in two hours and from 29° C. 80% to 10° C. 10% in two hours) that is set in advance, the temperature and humidity during the reciprocation are gradually and repeatedly changed within the temperature range and the relative humidity range of 10° C. to 45° C. and 10% to 80%, respectively, independently of the above-mentioned reciprocation.

This evaluation was repeated until "the environmental change program set in advance" was finished. After the evaluation was finished, an average value (simple average) was measured using all the absolute values of the "change in tape width" obtained during each reciprocation, and the calculated value was used as the "effective amount of change in tape width" of the tape. Each tape was determined in accordance with the deviation (the smaller it is, the more desirable) of this effective amount of change in tape width from the ideal, and eight stages of determination values are given thereto. Note that evaluation "8" indicated the most desirable determination result, and evaluation "1" indicated the most undesirable determination result. In the magnetic tape having evaluation of any of the above-mentioned eight stages, the following condition is observed at the time of tape travelling.

8: Abnormality does not occur
7: A slight increase in error rate is observed at the time of travelling
6: A significant increase in error rate is observed at the time of travelling
5: A serve signal cannot be read and a few times of (1 to 2) reloading is performed at the time of travelling
4: A serve signal cannot be read and several times (up to 10) of reloading is performed at the time of travelling
3: A serve signal cannot be read and many times (more than 10) of reloading is performed at the time of travelling
2: A serve signal cannot be read, and it occasionally stops due to a system error
1: A serve signal cannot be read, and it immediately stops due to a system error Table 1 shows magnetic properties and evaluation results of Examples 1 to 18 and Comparative Examples 1 to 9.

TABLE 1

| | Magnetic powder | | | | | Tape | | | | | | | |
|---|---|---|---|---|---|---|---|---|---|---|---|---|---|
| | No. | Composition | Particle shape | Average aspect ratio | Average particle size [nm] | Average particle volume [nm$^3$] | Medium configuration | Underlayer average thickness [μm] | Magnetic layer average thickness [nm] | Tape average thickness [μm] | Hc1 [Oe] | Hc2 [Oe] | Hc2/Hc1 | Evaluation result C/N [dB] |
| Example 1 | 1A | BaFe$_{12}$O$_{19}$ | Plate-like | 2.8 | 20.3 | 1950 | 1 | 1.1 | 80 | 5.6 | 2750 | 2000 | 0.73 | 2.0 |
| Example 2 | 2A | BaFe$_{12}$O$_{19}$ | Plate-like | 2.6 | 18.6 | 1600 | 1 | 1.1 | 60 | 5.6 | 2920 | 1920 | 0.66 | 3.8 |
| Example 3 | 3A | BaFe$_{12}$O$_{19}$ | Plate-like | 3 | 21.3 | 2100 | 1 | 1.1 | 80 | 5.6 | 2750 | 2000 | 0.73 | 1.7 |
| Example 4 | 1A | BaFe$_{12}$O$_{19}$ | Plate-like | 2.8 | 20.3 | 1950 | 1 | 1.1 | 90 | 5.6 | 2750 | 2000 | 0.73 | 1.6 |
| Example 5 | 4A | BaFe$_{12}$O$_{19}$ | Plate-like | 2.9 | 20.9 | 2050 | 1 | 1.1 | 80 | 5.6 | 2980 | 2000 | 0.67 | 2.6 |
| Example 6 | 7A | ε-Fe$_2$O$_3$ | Spherical | 1.3 | 15.7 | 2050 | 1 | 1.1 | 80 | 5.6 | 2850 | 2020 | 0.71 | 2.1 |
| Example 7 | 8A | CoO(Fe$_2$O$_3$) | Cubic | 1.1 | 12.6 | 2030 | 1 | 1.1 | 80 | 5.6 | 2800 | 2020 | 0.72 | 1.9 |
| Example 8 | 5A | BaFe$_{12}$O$_{19}$ | Plate-like | 2.3 | 17.0 | 1400 | 1 | 1.1 | 60 | 5.6 | 2550 | 1820 | 0.71 | 3 |
| Example 9 | 6A | BaFe$_{12}$O$_{19}$ | Plate-like | 2 | 15.0 | 1100 | 1 | 1.1 | 60 | 5.6 | 2500 | 1840 | 0.74 | 3.3 |
| Example 10 | 1A | BaFe$_{12}$O$_{19}$ | Plate-like | 2.8 | 20.3 | 1950 | 2 | 1.1 | 80 | 5.6 | 2750 | 2000 | 0.73 | 1.6 |
| Example 11 | 2A | BaFe$_{12}$O$_{19}$ | Plate-like | 2.6 | 18.6 | 1600 | 3 | 1.1 | 60 | 5.2 | 2920 | 1920 | 0.66 | 3.3 |
| Example 12 | 5A | BaFe$_{12}$O$_{19}$ | Plate-like | 2.3 | 17.0 | 1400 | 4 | 1.1 | 60 | 5.2 | 2550 | 1820 | 0.71 | 2.5 |
| Example 13 | 5A | BaFe$_{12}$O$_{19}$ | Plate-like | 2.3 | 17.0 | 1400 | 5 | 1.0 | 60 | 4.5 | 2550 | 1820 | 0.71 | 2 |
| Example 14 | 6A | BaFe$_{12}$O$_{19}$ | Plate-like | 2 | 15.0 | 1100 | 6 | 1.0 | 60 | 4.5 | 2500 | 1840 | 0.74 | 2.3 |
| Example 15 | 1A | BaFe$_{12}$O$_{19}$ | Plate-like | 2.8 | 20.3 | 1950 | 1 | 1.1 | 90 | 5.6 | 2990 | 1500 | 0.50 | 3.0 |
| Example 16 | 1A | BaFe$_{12}$O$_{19}$ | Plate-like | 2.8 | 20.3 | 1950 | 1 | 1.1 | 80 | 5.6 | 2690 | 2150 | 0.80 | 1.3 |
| Example 17 | 7A | ε-Fe$_2$O$_3$ | Spherical | 1.3 | 15.7 | 2050 | 1 | 1.1 | 90 | 5.6 | 2900 | 1950 | 0.67 | 2.5 |
| Example 18 | 1A | BaFe$_{12}$O$_{19}$ | Plate-like | 2.8 | 20.3 | 1950 | 1 | 1.1 | 80 | 5.6 | 2750 | 2000 | 0.73 | 2.0 |
| Comparative Example 1 | 2B | BaFe$_{12}$O$_{19}$ | Plate-like | 3.5 | 23.6 | 2450 | 1 | 1.1 | 85 | 5.6 | 2820 | 2000 | 0.71 | 0 |
| Comparative Example 2 | 1A | BaFe$_{12}$O$_{19}$ | Plate-like | 2.8 | 20.3 | 1950 | 1 | 1.1 | 100 | 5.6 | 2750 | 2000 | 0.73 | 1 |
| Comparative Example 3 | 1A | BaFe$_{12}$O$_{19}$ | Plate-like | 2.8 | 20.3 | 1950 | 1 | 1.1 | 85 | 5.6 | 2500 | 2100 | 0.84 | 0.3 |
| Comparative Example 4 | 9A | BaFe$_{12}$O$_{19}$ | Plate-like | 3.0 | 21.3 | 2090 | 1 | 1.1 | 80 | 5.6 | 3100 | 2000 | 0.65 | 0.9 |
| Comparative Example 5 | 7A | ε-Fe$_2$O$_3$ | Spherical | 1.3 | 15.7 | 2050 | 1 | 1.1 | 80 | 5.6 | 2550 | 2080 | 0.82 | 0.7 |
| Comparative Example 6 | 8A | CoO(Fe$_2$O$_3$) | Cubic | 1.1 | 12.6 | 2030 | 1 | 1.1 | 80 | 5.6 | 2450 | 2080 | 0.85 | 0.6 |
| Comparative Example 7 | 1A | BaFe$_{12}$O$_{19}$ | Plate-like | 2.8 | 20.3 | 1950 | 1 | 1.1 | 80 | 5.6 | 2750 | 2000 | 0.73 | 2.0 |
| Comparative Example 8 | 1A | BaFe$_{12}$O$_{19}$ | Plate-like | 2.8 | 20.3 | 1950 | 1 | 1.1 | 80 | 5.6 | 2750 | 2000 | 0.73 | 2.0 |
| Comparative Example 9 | 1A | BaFe$_{12}$O$_{20}$ | Plate-like | 2.8 | 20.3 | 1950 | 1 | 1.1 | 80 | 5.6 | 2750 | 2000 | 0.73 | 2.0 |

Table 2 shows the evaluation results of the magnetic tapes according to Examples 1 to 18 and Comparative Examples 1 to 9.

Hc2 in the longitudinal direction satisfy the relationship of Hc2/Hc1≤0.8. As a result, it is possible to achieve favorable C/N.

TABLE 2

|  | Magnetic tape longitudinal 1% elongation load [N] | Magnetic tape longitudinal contraction rate [%] | Magnetic tape average thickness TL [μm] | Base film average thickness TB [μm] | (TL − TB)/TB | Magnetic tape Young's modulus (longitudinal direction) [GPa] | Base film Young's modulus (longitudinal direction) [GPa] | Determination |
|---|---|---|---|---|---|---|---|---|
| Example 1 | 0.57 | 0.09 | 5.6 | 4.0 | 0.40 | 8.1 | 7.6 | 8 |
| Example 2 | 0.57 | 0.09 | 5.6 | 4.0 | 0.40 | 8.1 | 7.6 | 8 |
| Example 3 | 0.57 | 0.09 | 5.6 | 4.0 | 0.40 | 8.1 | 7.6 | 8 |
| Example 4 | 0.57 | 0.09 | 5.6 | 4.0 | 0.40 | 8.1 | 7.6 | 8 |
| Example 5 | 0.57 | 0.09 | 5.6 | 4.0 | 0.40 | 8.1 | 7.6 | 8 |
| Example 6 | 0.55 | 0.09 | 5.6 | 4.0 | 0.40 | 8.1 | 7.6 | 8 |
| Example 7 | 0.55 | 0.09 | 5.6 | 4.0 | 0.40 | 8.1 | 7.6 | 8 |
| Example 8 | 0.56 | 0.09 | 5.6 | 4.0 | 0.40 | 8.1 | 7.6 | 8 |
| Example 9 | 0.55 | 0.09 | 5.6 | 4.0 | 0.40 | 8.1 | 7.6 | 8 |
| Example 10 | 0.57 | 0.09 | 5.6 | 4.0 | 0.40 | 8.1 | 7.6 | 8 |
| Example 11 | 0.58 | 0.09 | 5.2 | 3.7 | 0.41 | 8.3 | 7.8 | 8 |
| Example 12 | 0.57 | 0.09 | 5.2 | 3.7 | 0.41 | 8.3 | 7.8 | 8 |
| Example 13 | 0.57 | 0.09 | 4.5 | 3.2 | 0.41 | 8.3 | 7.8 | 8 |
| Example 14 | 0.56 | 0.09 | 4.5 | 3.2 | 0.41 | 8.3 | 7.8 | 8 |
| Example 15 | 0.58 | 0.09 | 5.6 | 4.0 | 0.40 | 8.1 | 7.6 | 8 |
| Example 16 | 0.58 | 0.09 | 5.6 | 4.0 | 0.40 | 8.1 | 7.6 | 8 |
| Example 17 | 0.55 | 0.09 | 5.6 | 4.0 | 0.40 | 8.1 | 7.6 | 8 |
| Example 18 | 0.57 | 0.11 | 5.6 | 4.0 | 0.40 | 8.1 | 7.6 | 7 |
| Comparative Example 1 | 0.58 | 0.09 | 5.6 | 4.0 | 0.40 | 8.1 | 7.6 | 8 |
| Comparative Example 2 | 0.58 | 0.09 | 5.6 | 4.0 | 0.40 | 8.1 | 7.6 | 8 |
| Comparative Example 3 | 0.57 | 0.09 | 5.6 | 4.0 | 0.40 | 8.1 | 7.6 | 8 |
| Comparative Example 4 | 0.58 | 0.09 | 5.6 | 4.0 | 0.40 | 8.1 | 7.6 | 8 |
| Comparative Example 5 | 0.55 | 0.09 | 5.6 | 4.0 | 0.40 | 8.1 | 7.6 | 8 |
| Comparative Example 6 | 0.55 | 0.09 | 5.6 | 4.0 | 0.40 | 8.1 | 7.6 | 8 |
| Comparative Example 7 | 0.61 | 0.09 | 5.6 | 4.0 | 0.40 | 8.4 | 8 | 1 |
| Comparative Example 8 | 0.62 | 0.09 | 5.6 | 3.9 | 0.44 | 8.6 | 7.8 | 1 |
| Comparative Example 9 | 0.61 | 0.09 | 5.6 | 4.0 | 0.40 | 8.4 | 8.1 | 1 |

Tables 3 shows medium configuration adopted in each of the magnetic tapes according to Examples 1 to 18 and Comparative Examples 1 to 9.

Also in Examples 6, 7, and 17 in which the powder of ε-iron oxide particles or the powder of Co-containing spinel ferrite particles has been used as the magnetic powder, it is

TABLE 3

|  | Tape configuration | Magnetic tape average thickness [μm] | Number of servo tracks | Base film average thickness [μm] | W/L | W [μm] | L [μm] |
|---|---|---|---|---|---|---|---|
| Medium configuration 1 | Magnetic layer/Underlayer/Basefilm/Back layer | 5.6 | 5 | 4.0 | 50 | 2.9 | 0.052 |
| Medium configuration 2 | Magnetic layer/Underlayer/Basefilm/Back layer | 5.6 | 5 | 4.0 | 30 | 1.5 | 0.048 |
| Medium configuration 3 | Magnetic layer/Underlayer/Basefilm/Back layer | 5.2 | 5 | 3.6 | 23 | 0.95 | 0.042 |
| Medium configuration 4 | Magnetic layer/Underlayer/Basefilm/Back layer | 5.2 | 9 | 3.6 | 13 | 0.51 | 0.039 |
| Medium configuration 5 | Magnetic layer/Underlayer/Basefilm/Back layer | 4.5 | 9 | 3.1 | 21 | 0.83 | 0.039 |
| Medium configuration 6 | Magnetic layer/Underlayer/Basefilm/Back layer | 4.5 | 9 | 3.1 | 16 | 0.63 | 0.038 |

From Table 1 and Table 3, the following can be seen.

In Examples 1 to 5, 15, and 16, (1) the average thickness of a magnetic layer is not more than 90 nm, (2) the average aspect ratio of a magnetic powder is not less than 1.0 and not more than 3.0, (3) the coercive force Hc1 in the vertical direction is not more than 3000 Oe, and (4) the coercive force Hc1 in the vertical direction and the coercive force Hc2 in the longitudinal direction satisfy the relationship of Hc2/Hc1≤0.8. As a result, it is possible to achieve favorable C/N.

possible to achieve favorable C/N by satisfying the above-mentioned configurations of (1) to (4) similarly to Examples 1 to 5 in which the powder of hexagonal ferrite particles has been used as the magnetic powder.

Also in Examples 8 and 9 in which the powder of ultrafine particles has been used as the magnetic powder, it is possible to achieve favorable C/N by satisfying the above-mentioned configurations of (1) to (4).

Also in Examples 10 to 14 in which the recording density has been improved as compared with those in Examples 1 to 9 and 15 to 17, it is possible to achieve favorable C/N by satisfying the above-mentioned configurations of (1) to (4).

In Comparative Example 1, since the average aspect ratio of the magnetic powder exceeds 3.0, i.e., the above-mentioned configuration of (2) is not satisfied, the magnetic powder is stacked and favorable C/N cannot be achieved.

In Comparative Example 2, since the average thickness of the magnetic layer exceeds 90 nm, i.e., the above-mentioned configuration of (1) is not satisfied, the characteristics of the short wavelength deteriorate and favorable C/N cannot be achieved.

In Comparative Example 3, since Hc2/Hc1 exceeds 0.8, i.e., the configuration of (4) is not satisfied, the degree of vertical orientation of the magnetic powder is low. Therefore, favorable C/N cannot be achieved.

In Comparative Example 4, the coercive force Hc1 in the vertical direction exceeds 3000 Oe, i.e., the above-mentioned configuration of (3) is not satisfied, saturated recording in a recording head becomes difficult. Therefore, favorable C/N cannot be achieved.

Also in Comparative Examples 5 and 6 in which ε-iron oxide or the Co-containing spinel ferrite has been used as the magnetic powder, favorable C/N cannot be achieved unless the above-mentioned configurations of (1) to (4) are not satisfied, similarly to Comparative Examples 1 to 4 in which hexagonal ferrite has been used as the magnetic powder.

From the determination results of Examples 1 and 11, Comparative Examples 7 to 9, and the like, it can be seen that it is possible to suppress the deviation of "effective amount of change in tape width" from the ideal in the case where (1) the average thickness of the magnetic layer is not more than 90 nm, (2) the average aspect ratio of the magnetic powder is not less than 1.0 and not more than 3.0, (3) the coercive force Hc1 in the vertical direction is not more than 3000 Oe, (4) the coercive force Hc1 in the vertical direction and the coercive force Hc2 in the longitudinal direction satisfy the relationship of Hc2/Hc1≤0.8, and (5) the longitudinal 1% elongation load of the magnetic tape is not more than 0.6 N.

Although embodiments of the present disclosure and modified examples thereof have been specifically described above, the present disclosure is not limited to the above-mentioned embodiments and modified examples thereof and various modifications can be made on the basis of the technical idea of the present disclosure.

For example, the configurations, the methods, the steps, the shapes, the materials, and the numerical values cited in the above-mentioned embodiments and modified examples thereof are only illustrative, and different configurations, methods, steps, shapes, materials, and numerical values may be used as necessary. Further, the chemical formulae of compounds and the like are representative, and are not limited to the described valences and the like as long as they are common names of the same compound.

Further, the configurations, the methods, the steps, the shapes, the materials, and the numerical values in the above-mentioned embodiments and modified examples thereof can be combined without departing from the essence of the present disclosure.

Further, in the present specification, the numerical range indicated by using "to" represents a range including the numerical values described before and after "to" as the minimum value and the maximum value, respectively. Within the numerical range described in a stepwise manner in the present specification, the upper limit value or the lower limit value of the numerical range in a certain step may be replaced with the upper limit value or the lower limit value of the numerical range in another step. The materials illustrated in the present specification can be used alone or in combination unless otherwise specified.

Further, the present disclosure may also take the following configurations.

(1)

A tape-shaped magnetic recording medium, including:

a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a value of σ1.5−σ0.5 is not more than 0.6 N in a tensile test of the magnetic recording medium in the longitudinal direction, where σ0.5 is a load at an elongation rate of 0.5% in the magnetic recording medium and σ1.5 is a load at an elongation rate of 1.5% in the magnetic recording medium.

(2)

The magnetic recording medium according to (1), in which a contraction ratio in the longitudinal direction of the magnetic recording medium preserved at 60° C. for 72 hours is not more than 0.1%.

(3)

The magnetic recording medium according to (1) or (2), in which a value of (TL−TB)/TB is not more than 0.41, where TB is an average thickness of the substrate and TL is an average thickness of the magnetic recording medium.

(4)

The magnetic recording medium according to any one of (1) to (3), in which a Young's modulus in the longitudinal direction of the magnetic recording medium is not more than 8.5 GPa.

(5)

The magnetic recording medium according to any one of (1) to (4), in which a Young's modulus in the longitudinal direction of the substrate is not more than 8.0 GPa.

(6)

The magnetic recording medium according to any one of (1) to (5), in which the magnetic recording medium is configured to have a width that is adjustable by increasing and decreasing tension in the longitudinal direction.

(7)

The magnetic recording medium according to any one of (1) to (6), in which the magnetic layer includes a plurality of servo bands, and a ratio of a total area of the servo bands to an area of a surface of the magnetic layer is not more than 4.0%.

(8)

The magnetic recording medium according to (7), in which the number of the servo bands is not less than five.

(9)

The magnetic recording medium according to (7) or (8), in which the number of the servo bands is not less than 5+4n (where n represents a positive number).

(10)

The magnetic recording medium according to any one of (7) to (9), in which the servo bands each have a width of not more than 95 μm.

(11)

The magnetic recording medium according to any one of (1) to (10), in which the magnetic layer is configured to be capable of having a plurality of data tracks, and each of the data tracks has a width of not more than 3.0 μm.

(12)

The magnetic recording medium according to any one of (1) to (11), in which the magnetic layer is configured to be capable of recording data so that a ratio W/L of a width W of each of data tracks to a minimum value L of a magnetization reversal pitch satisfies a relationship of W/L≤200.

(13)

The magnetic recording medium according to any one of (1) to (12), in which the magnetic layer is configured to be capable of recording data so that a minimum value of a magnetization reversal pitch L is not more than 48 nm.

(14)

The magnetic recording medium according to any one of (1) to (13), in which the coercive force Hc1 in the longitudinal direction is not more than 2000 Oe.

(15)

The magnetic recording medium according to any one of (1) to (14), in which an average thickness of the magnetic recording medium is not more than 5.6 μm.

(16)

The magnetic recording medium according to any one of (1) to (15), in which an average thickness of the substrate is not more than 4.2 μm.

(17)

The magnetic recording medium according to any one of (1) to (16), in which an average thickness of the magnetic recording medium is not more than 5.6 μm, the magnetic layer includes a plurality of servo bands, the number of servo bands being not less than five, and the magnetic layer is configured to be capable of having a plurality of data tracks, each of the data tracks having a width of not more than 1.6 μm, a minimum value of the magnetization reversal pitch L being not more than 50 nm, a ratio W/L of a width W of each of the data tracks to the minimum value of the magnetization reversal pitch L satisfying a relationship of W/L≤30.

(18)

The magnetic recording medium according to any one of (1) to (17), in which the magnetic powder contains hexagonal ferrite, ε-iron oxide, or Co-containing spinel ferrite.

(19)

The magnetic recording medium according to (18), in which the hexagonal ferrite contains at least one of Ba or Sr, and the ε-iron oxide contains at least one of Al or Ga.

(20)

The magnetic recording medium according to any one of (1) to (19), in which the average thickness of the magnetic layer is not more than 80 nm.

(21) The magnetic recording medium according to any one of (1) to (20), in which the average thickness of the magnetic layer is not more than 70 nm.

(22)

The magnetic recording medium according to any one of (1) to (21), in which the coercive force Hc1 in the vertical direction and the coercive force Hc2 in the longitudinal direction satisfy a relationship of Hc2/Hc1≤0.7.

(23)

The magnetic recording medium according to any one of (1) to (22), in which the coercive force Hc1 in the vertical direction is not less than 2200 Oe.

(24) A tape-shaped magnetic recording medium, including:

a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a contraction ratio in the longitudinal direction of the magnetic recording medium preserved at 60° C. for 72 hours is not more than 0.1%.

(25)

A tape-shaped magnetic recording medium, including:

a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a value of (TL−TB)/TB is not more than 0.41, where TB is an average thickness of the substrate and TL is an average thickness of the magnetic recording medium.

(26)

A tape-shaped magnetic recording medium, including:

a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a Young's modulus in the longitudinal direction of the magnetic recording medium is not more than 8.5 GPa.

(27)

A tape-shaped magnetic recording medium, including:

a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a Young's modulus in the longitudinal direction of the substrate is not more than 8.0 GPa.

(28)

A tape-shaped magnetic recording medium, including:

a substrate; and a magnetic layer that is provided on the substrate and contains a magnetic powder, in which an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and the magnetic recording medium is configured to have a width that is adjustable by increasing and decreasing tension in the longitudinal direction.

REFERENCE SIGNS LIST 10 magnetic recording medium
10A magnetic recording medium cartridge
10B cartridge case
10C reel
11 substrate
12 underlayer
13 magnetic layer
14 back layer
15 barrier layer
21 core portion
22 shell portion
22a first shell portion
22b second shell portion
30 recording/reproduction apparatus
31 spindle
32 reel
33 spindle driving device
34 reel driving device
35 guide roller
36 head unit
37 communication interface
38 control device
41 server
42 personal computer
43 network

The invention claimed is:

1. A tape-shaped magnetic recording medium, comprising:

a substrate; and a magnetic layer that is provided on the substrate and contains a magnetic powder, wherein an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and a value of σ1.5−σ0.5 is not more than 0.6 N in a tensile test of the magnetic recording medium in the longitudinal direction, where σ0.5 is a load at an elongation rate of 0.5% in the magnetic recording medium and σ1.5 is a load at an elongation rate of 1.5% in the magnetic recording medium.

2. The magnetic recording medium according to claim 1, wherein a contraction ratio in the longitudinal direction of the magnetic recording medium preserved at 60° C. for 72 hours is not more than 0.1%.

3. The magnetic recording medium according to claim 1, wherein a value of (TL−TB)/TB is not more than 0.41, where TB is an average thickness of the substrate and TL is an average thickness of the magnetic recording medium.

4. The magnetic recording medium according to claim 1, wherein a Young's modulus in the longitudinal direction of the magnetic recording medium is not more than 8.5 GPa.

5. The magnetic recording medium according to claim 1, wherein a Young's modulus in the longitudinal direction of the substrate is not more than 8.0 GPa.

6. The magnetic recording medium according to claim 1, wherein the magnetic recording medium is configured to have a width that is adjustable by increasing and decreasing tension in the longitudinal direction.

7. The magnetic recording medium according to claim 1, wherein the magnetic layer includes a plurality of servo bands, and a ratio of a total area of the servo bands to an area of a surface of the magnetic layer is not more than 4.0%.

8. The magnetic recording medium according to claim 7, wherein the number of the servo bands is not less than five.

9. The magnetic recording medium according to claim 7, wherein the number of the servo bands is not less than 5+4n (where n represents a positive number).

10. The magnetic recording medium according to claim 7, wherein the servo bands each have a width of not more than 95 μm.

11. The magnetic recording medium according to claim 1, wherein the magnetic layer is configured to be capable of having a plurality of data tracks, and each of the data tracks has a width of not more than 3.0 μm.

12. The magnetic recording medium according to claim 1, wherein
the magnetic layer is configured to be capable of recording data so that a ratio W/L of a width W of each of data tracks to a minimum value L of a magnetization reversal pitch satisfies a relationship of W/L≤200.

13. The magnetic recording medium according to claim 1, wherein
the magnetic layer is configured to be capable of recording data so that a minimum value L of a magnetization reversal pitch is not more than 48 nm.

14. The magnetic recording medium according to claim 1, wherein
the coercive force Hc2 in the longitudinal direction is not more than 2000 Oe.

15. The magnetic recording medium according to claim 1, wherein
an average thickness of the magnetic recording medium is not more than 5.6 µm.

16. The magnetic recording medium according to claim 1, wherein
an average thickness of the substrate is not more than 4.2 µm.

17. The magnetic recording medium according to claim 1, wherein
an average thickness of the magnetic recording medium is not more than 5.6 µm,
the magnetic layer includes a plurality of servo bands, the number of servo bands being not less than five, and
the magnetic layer is configured to be capable of having a plurality of data tracks, each of the data tracks having a width of not more than 1.6 µm, a minimum value of the magnetization reversal pitch L being not more than 50 nm, a ratio W/L of a width W of each of the data tracks to the minimum value L of the magnetization reversal pitch satisfying a relationship of W/L≤30.

18. The magnetic recording medium according to claim 1, wherein
the magnetic powder contains hexagonal ferrite, ε-iron oxide, or Co-containing spinel ferrite.

19. The magnetic recording medium according to claim 18, wherein
the hexagonal ferrite contains at least one of Ba or Sr, and
the ε-iron oxide contains at least one of Al or Ga.

20. The magnetic recording medium according to claim 18, wherein
the average thickness of the magnetic layer is not more than 80 nm.

21. The magnetic recording medium according to claim 1, wherein
the average thickness of the magnetic layer is not more than 70 nm.

22. The magnetic recording medium according to claim 1, wherein
the coercive force Hc1 in the vertical direction and the coercive force Hc2 in the longitudinal direction satisfy a relationship of Hc2/Hc1≤0.7.

23. The magnetic recording medium according to claim 1, wherein
the coercive force Hc1 in the vertical direction is not less than 2200 Oe.

24. A tape-shaped magnetic recording medium, comprising:
a substrate; and
a magnetic layer that is provided on the substrate and contains a magnetic powder, wherein
an average thickness of the magnetic layer is not more than 90 nm,
an average aspect ratio of the magnetic powder is not less than 1.0 and not more than 3.0,
a coercive force Hc1 in a vertical direction is not more than 3000 Oe,
the coercive force Hc1 in the vertical direction and a coercive force Hc2 in a longitudinal direction satisfy a relationship of Hc2/Hc1≤0.8, and
a contraction ratio in the longitudinal direction of the magnetic recording medium preserved at 60° C. for 72 hours is not more than 0.1%.

25. A tape-shaped magnetic recording medium, comprising:
a substrate; and
a magnetic layer that is provided on the substrate and contains a magnetic powder, wherein
an average thickness of the magnetic layer is not more than 90 nm,
an average aspect ratio of the magnetic powder is not less than 1.0 and not more than 3.0,
a coercive force Hc1 in a vertical direction is not more than 3000 Oe,
the coercive force Hc1 in the vertical direction and a coercive force Hc2 in a longitudinal direction satisfy a relationship of Hc2/Hc1≤0.8, and
a value of (TL−TB)/TB is not more than 0.41, where TB is an average thickness of the substrate and TL is an average thickness of the magnetic recording medium.

26. A tape-shaped magnetic recording medium, comprising:
a substrate; and
a magnetic layer that is provided on the substrate and contains a magnetic powder, wherein
an average thickness of the magnetic layer is not more than 90 nm,
an average aspect ratio of the magnetic powder is not less than 1.0 and not more than 3.0,
a coercive force Hc1 in a vertical direction is not more than 3000 Oe,
the coercive force Hc1 in the vertical direction and a coercive force Hc2 in a longitudinal direction satisfy a relationship of Hc2/Hc1≤0.8, and
a Young's modulus in the longitudinal direction of the magnetic recording medium is not more than 8.5 GPa.

27. A tape-shaped magnetic recording medium, comprising:
a substrate; and
a magnetic layer that is provided on the substrate and contains a magnetic powder, wherein
an average thickness of the magnetic layer is not more than 90 nm,
an average aspect ratio of the magnetic powder is not less than 1.0 and not more than 3.0,
a coercive force Hc1 in a vertical direction is not more than 3000 Oe,
the coercive force Hc1 in the vertical direction and a coercive force Hc2 in a longitudinal direction satisfy a relationship of Hc2/Hc1≤0.8, and
a Young's modulus in the longitudinal direction of the substrate is not more than 8.0 GPa.

28. A tape-shaped magnetic recording medium, comprising:
a substrate; and
a magnetic layer that is provided on the substrate and contains a magnetic powder, wherein an average thickness of the magnetic layer is not more than 90 nm, an average aspect ratio of the magnetic powder is not less than 1.0 and not more than 3.0, a coercive force Hc1 in a vertical direction is not more than 3000 Oe, the coercive force Hc1 in the vertical direction and a coercive force Hc2 in a longitudinal direction satisfy a relationship of Hc2/Hc1≤0.8, and the magnetic recording medium is configured to have a width that is adjustable by increasing and decreasing tension in the longitudinal direction.

* * * * *